US012379855B2

United States Patent
Kim et al.

(10) Patent No.: US 12,379,855 B2
(45) Date of Patent: *Aug. 5, 2025

(54) SEMICONDUCTOR MEMORY DEVICE INCLUDING A CYCLIC REDUNDANCY CHECK ENGINE AND MEMORY SYSTEM INCLUDING THE SAME

(71) Applicant: Samsung Electronics Co., Ltd., Suwon-si (KR)

(72) Inventors: Sungrae Kim, Seoul (KR); Hyeran Kim, Uiwang-si (KR); Myungkyu Lee, Seoul (KR); Chisung Oh, Suwon-si (KR); Kijun Lee, Seoul (KR); Sunghye Cho, Hwaseong-si (KR); Sanguhn Cha, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,599

(22) Filed: Feb. 27, 2024

(65) Prior Publication Data

US 2024/0201868 A1 Jun. 20, 2024

Related U.S. Application Data

(63) Continuation of application No. 17/743,137, filed on May 12, 2022, now Pat. No. 11,947,810.

(30) Foreign Application Priority Data

May 31, 2021 (KR) .......................... 10-2021-0069726

(51) Int. Cl.
*G06F 3/06* (2006.01)
(52) U.S. Cl.
CPC .......... *G06F 3/0619* (2013.01); *G06F 3/0655* (2013.01); *G06F 3/0656* (2013.01); *G06F 3/0679* (2013.01)

(58) Field of Classification Search
CPC .... G06F 3/0619; G06F 3/0655; G06F 3/0656; G06F 3/0679; G06F 3/064; G06F 11/07;
(Continued)

(56) References Cited

U.S. PATENT DOCUMENTS 5,600,662 A 2/1997 Zook
5,842,007 A 11/1998 Tarsky et al.
(Continued)

FOREIGN PATENT DOCUMENTS

CA 2178454 A1 * 12/1996 .............. G06F 11/16
CA 2277981 A1 8/1998
(Continued)

OTHER PUBLICATIONS

Search Report for Taiwanese Patent Application No. 111118033, mailed Apr. 24, 2023, 2 pages.

*Primary Examiner* — Christopher D Birkhimer
(74) *Attorney, Agent, or Firm* — Myers Bigel, P.A.

(57) ABSTRACT

A semiconductor memory device includes a memory cell array and a cyclic redundancy check (CRC) engine. The memory cell array includes a plurality of volatile memory cells coupled to respective ones of a plurality of word-lines and respective ones of a plurality of bit-lines. The CRC engine, during a memory operation on the memory cell array, detects an error in a main data and a system parity data provided from a memory controller external to the semiconductor memory device through a link, generates an error flag indicating whether the detected error corresponds to either a first type of error associated with the link or a second type of error associated with the volatile memory cells based on the system parity data and transmit the error flag to the memory controller.

20 Claims, 25 Drawing Sheets

(58) Field of Classification Search
CPC ............ G06F 11/1004; G06F 11/1044; G06F 11/1032; G06F 11/1048; G11C 29/42; G11C 11/409
See application file for complete search history.

(56) References Cited

U.S. PATENT DOCUMENTS

| | | | |
|---|---|---|---|
| 5,956,102 A | 9/1999 | Lane | |
| 6,032,283 A | 2/2000 | Meyer | |
| 6,052,815 A | 4/2000 | Zook | |
| 6,092,231 A | 7/2000 | Sze | |
| 7,325,052 B1* | 1/2008 | Motoyama | G06F 21/554 358/1.14 |
| 7,539,926 B1 | 5/2009 | Lesea | |
| 7,694,204 B2 | 4/2010 | Schmidt et al. | |
| 8,321,778 B2 | 11/2012 | Bains | |
| 8,448,050 B2 | 5/2013 | Sakaue et al. | |
| 8,909,942 B1* | 12/2014 | Obukhov | G06F 12/1408 257/659 |
| 9,111,621 B2* | 8/2015 | Krutzik | G11C 16/22 |
| 9,268,632 B2 | 2/2016 | Linstadt | |
| 9,425,829 B2 | 8/2016 | Ramaraju et al. | |
| 9,965,352 B2 | 5/2018 | Suh et al. | |
| 10,243,584 B2 | 3/2019 | Yu et al. | |
| 10,846,171 B2 | 11/2020 | Cho et al. | |
| 10,872,011 B2 | 12/2020 | Bains et al. | |
| 10,915,398 B2 | 2/2021 | Chung et al. | |
| 2001/0025340 A1* | 9/2001 | Marchant | G06F 21/6272 713/150 |
| 2006/0004957 A1* | 1/2006 | Hand, III | G06F 12/0866 711/E12.019 |
| 2006/0005074 A1* | 1/2006 | Yanai | G06F 11/2066 714/6.32 |
| 2007/0162825 A1* | 7/2007 | Wang | G06F 11/0793 714/763 |
| 2008/0189477 A1* | 8/2008 | Asano | G06F 12/0246 711/E12.008 |
| 2009/0172267 A1* | 7/2009 | Oribe | G11C 16/3418 711/E12.008 |
| 2009/0177895 A1* | 7/2009 | Murayama | G06F 21/6236 711/E12.001 |
| 2009/0220088 A1* | 9/2009 | Lu | G06F 21/554 713/189 |
| 2010/0005366 A1* | 1/2010 | Dell | G11C 29/70 714/764 |
| 2010/0162053 A1 | 6/2010 | Gillingham | |
| 2011/0161784 A1* | 6/2011 | Selinger | G06F 11/1016 714/E11.002 |
| 2014/0153034 A1* | 6/2014 | Fukushima | H04N 1/21 358/1.14 |
| 2014/0237315 A1 | 8/2014 | Fitzpatrick et al. | |
| 2015/0339188 A1* | 11/2015 | Hu | G06F 11/3034 714/704 |
| 2016/0055052 A1 | 2/2016 | Hu et al. | |
| 2016/0055059 A1 | 2/2016 | Hu et al. | |
| 2016/0266975 A1 | 9/2016 | Hu et al. | |
| 2018/0307848 A1* | 10/2018 | Leiseboer | G06F 21/78 |
| 2020/0012555 A1* | 1/2020 | Das Sharma | G06F 11/1402 |
| 2020/0218608 A1 | 7/2020 | Zhu | |
| 2020/0394102 A1 | 12/2020 | Cha et al. | |
| 2021/0027830 A1 | 1/2021 | Kim et al. | |
| 2021/0049068 A1 | 2/2021 | Schaefer et al. | |
| 2021/0081269 A1 | 3/2021 | Wang et al. | |

FOREIGN PATENT DOCUMENTS

| | | | | |
|---|---|---|---|---|
| CN | 101221795 A | | 7/2008 | |
| CN | 107229533 A | * | 10/2017 | .......... G06F 11/1004 |
| CN | 107925507 A | * | 4/2018 | .......... G06F 11/1004 |
| CN | 110362420 A | | 10/2019 | |
| CN | 110377453 A | | 10/2019 | |
| JP | 2004538548 A | | 12/2004 | |
| JP | 3800564 B2 | | 5/2006 | |
| KR | 20070092676 A | | 9/2007 | |
| KR | 101251100 B1 | | 4/2013 | |
| KR | 20200051927 A | | 5/2020 | |
| TW | 1269968 B | | 1/2007 | |
| TW | 1276964 B | | 3/2007 | |
| WO | WO-2009022874 A1 | * | 2/2009 | .......... G06F 11/1004 |
| WO | 2010069045 A1 | | 6/2010 | |
| WO | 2013093408 A1 | | 6/2013 | |
| WO | 2013093412 A1 | | 6/2013 | |
| WO | 2013093418 A1 | | 6/2013 | |

* cited by examiner

SEMICONDUCTOR MEMORY DEVICE INCLUDING A CYCLIC REDUNDANCY CHECK ENGINE AND MEMORY SYSTEM INCLUDING THE SAME

CROSS-REFERENCE TO RELATED APPLICATIONS

This application is a continuation application of U.S. patent application Ser. No. 17/743,137, filed May 12, 2022, which claims priority under 35 U.S.C. § 119 to Korean Patent Application No. 10-2021-0069726, filed on May 31, 2021 in the Korean Intellectual Property Office, the disclosure of each of which are incorporated by reference herein in their entirety.

BACKGROUND

Example embodiments relate to memory fields, and more particularly to semiconductor memory devices and memory systems including the same.

Semiconductor memory devices may be classified into non-volatile memory devices such as flash memory devices and volatile memory devices such as dynamic random access memories (DRAM)s. High speed operation and cost efficiency of DRAMs make it possible for DRAMs to be used for system memories. Due to the continuing shrink in fabrication design rule of DRAMs, bit errors of memory cells in the DRAMs may rapidly increase and yield of the DRAMs may decrease.

SUMMARY

Some example embodiments provide a semiconductor memory device capable of identifying an error generated during data transmission and an error generated in memory cells.

Some example embodiments provide a memory system including a semiconductor memory device capable of identifying an error generated during data transmission and an error generated in memory cells.

According to example embodiments, a semiconductor memory device includes a memory cell array and a cyclic redundancy check (CRC) engine. The memory cell array includes respective ones of a plurality of volatile memory cells coupled to respective ones of a plurality of word-lines and a plurality of bit-lines. The CRC engine configured, during a memory operation on the memory cell array, to perform operations including detecting an error in a main data and a system parity data received from a memory controller through a link, generating an error flag indicating whether the error that was detected corresponds to either a first type of error associated with the link or a second type of error associated with the volatile memory cells based on the system parity data, and transmitting the error flag to the memory controller.

According to example embodiments, a memory system includes a semiconductor memory device and a memory controller communicates with the semiconductor memory device and configured to control the semiconductor memory device. The semiconductor memory device includes a memory cell array, a first cyclic redundancy check (CRC) engine and an on-die error correction code (ECC) engine. The memory cell array includes a plurality of volatile memory cells coupled to respective ones of a plurality of word-lines and respective ones of a plurality of bit-lines. The first CRC engine, during a memory operation on the memory cell array, detects an error in a main data and a system parity data received from the memory controller through a link and generates a first error flag indicating whether the error that was detected corresponds to either a first type of error associated with the link or a second type of error associated with the volatile memory cells based on the system parity data. The on-die ECC engine performs an ECC encoding operation on the main data and the system parity data and performs an ECC decoding operation on the main data and the system parity data.

According to example embodiments, a semiconductor memory device includes a memory cell array, a cyclic redundancy check (CRC) engine and an on-die error correction code (ECC) engine. The memory cell array includes a plurality of volatile memory cells coupled to respective ones of a plurality of word-lines and respective ones of a plurality of bit-lines. The CRC engine, during a memory operation on the memory cell array, detects an error in a main data and a system parity data received from a memory controller through a link and generates an error flag indicating whether the error that was detected corresponds to either a first type of error associated with the link or a second type of error associated with the volatile memory cells based on the system parity data. The on-die ECC engine performs an ECC encoding operation on the main data and the system parity data and performs an ECC decoding operation on the main data and the system parity data. The CRC engine includes a CRC generator and a CRC checker. During memory operation based on a command from the memory controller, the CRC generator generates a first reference system parity data based on the main data provided from the memory controller and the CRC checker determines a logic level of the error flag associated with one of the first type of error and the second type of error based on comparison of the system parity data and the first reference system parity data.

Accordingly, in the semiconductor memory device and the memory system according to example embodiments, the semiconductor memory device stores the system parity data generated by the memory controller in the memory cell array and may determine that non single-bit error in the write data or the read data is generated in the link during data transmission or is generated in volatile memory cells in the memory cell array by using the system parity data.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Various example embodiments will be described more fully hereinafter with reference to the accompanying drawings, in which some example embodiments are shown.

Figure 1:
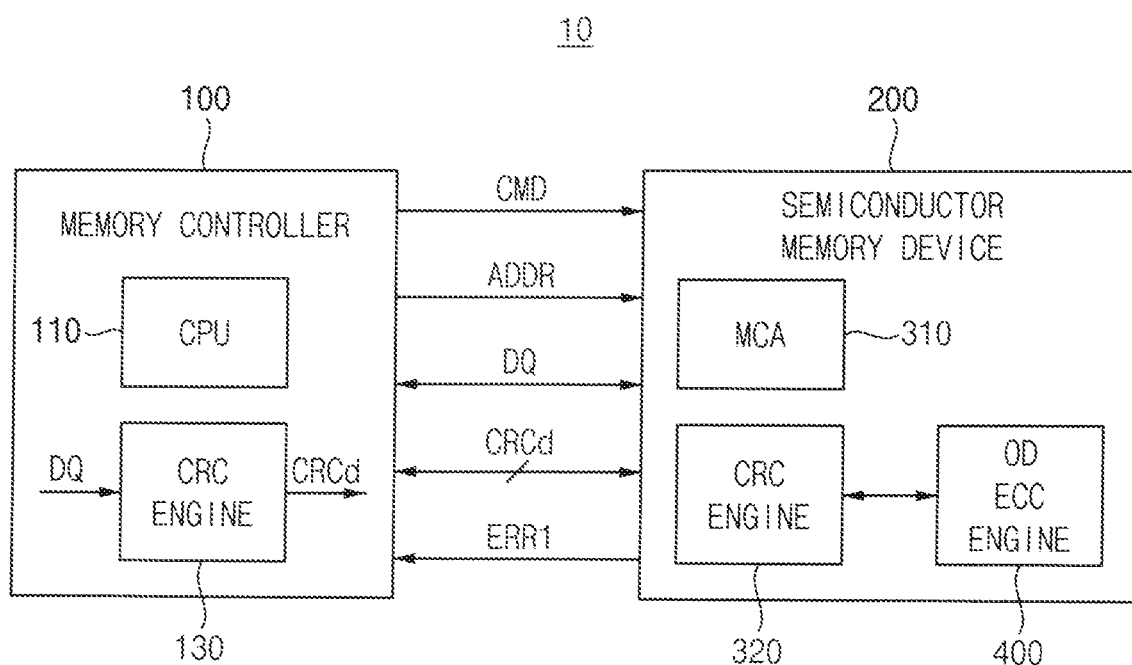
FIG. 1 is a block diagram illustrating a memory system according to example embodiments.

FIG. 1 is a block diagram illustrating a memory system according to example embodiments.

Referring to FIG. 1, a memory system 10 may include a memory controller 100 and a semiconductor memory device 200.

The memory controller 100 may control an overall operation of the memory system 10 and may control data exchange between an external host and the semiconductor memory device 200.

For example, the memory controller 100 may write data in the semiconductor memory device 200 or read data from the semiconductor memory device 200 in response to request from the host. In addition, the memory controller 100 may issue operation commands to the semiconductor memory device 200 for controlling the semiconductor memory device 200.

The memory controller 100 may transmit a command CMD and an address ADDR to the semiconductor memory device 200 and may exchange a main data DQ and a system parity data CRCd with the semiconductor memory device 200. The system parity data CRCd may be parity bits for detecting and/or correcting errors that occur during data transmission between the memory controller 100 and the semiconductor memory device 200 and may include cyclic redundancy check (CRC) bits. For example, the system parity data CRCd may include 16 bits.

The semiconductor memory device 200 may transmit, to the memory controller 100, a first error flag ERR1 indicating whether error(s) detected in the main data DQ and the system parity data CRCd corresponds to either a first type of error generated during data transmission and associated with a link or a second type of error associated with volatile memory cells (e.g., memory cells) in the semiconductor memory device 200.

In some embodiments, the semiconductor memory device 200 is a memory device including a plurality of dynamic (volatile) memory cells such as a dynamic random access memory (DRAM) including a graphic double data rate GDDR7 synchronous DRAM (SDRAM), but embodiments are not limited thereto.

The memory controller 100 may include a system a central processing unit (CPU) 110 and a CRC engine 130 and the semiconductor memory device 200 may include a CRC engine 320 an on-die OD error correction code (ECC) engine 400 and a memory cell array MCA 310.

The CRC engine 320 may be referred to as a first CRC engine and the CRC engine 130 may be referred to as a second CRC engine.

The CPU 110 may control overall operation of the memory controller 100.

The CRC engine 130 may generate the system parity data CRCd by performing a CRC operation on the main data DQ provided from the host and may transmit the main data DQ and the system parity data CRCd to the semiconductor memory device 200 in a write operation on the semiconductor memory device 200.

The CRC engine 130, in a read operation, may receive the main data DQ and the system parity data CRCd from the semiconductor memory device 200, and may generate a reference system parity data based on the main data DQ and may check or determine whether errors occur during the main data DQ. The system parity data CRCd are transmitted from the semiconductor memory device 200 based on comparison of the system parity data CRCd and the reference system parity data.

The CRC engine 320 in the semiconductor memory device 200, in the write operation, may generate a first reference system parity data based on the main data DQ, may generate the first error flag ERR1 associated with transmission error based on comparison of the system parity data CRCd and the first reference system parity data, and may transmit the first error flag ERR1 to the memory controller 100 through an error pin.

In response to the system parity data CRCd being different from the first reference system parity data, the CRC engine 320 may transmit the first error flag ERR1 having a first logic level (e.g., a logic high level) to the memory controller 100, and the memory controller 100 may transmit the main data DQ and the system parity data CRCd to the semiconductor memory device 200 again, in response to the first error flag ERR1 having a first logic level.

The on-die ECC engine 400, in the write operation, may perform an ECC encoding operation on the main data DQ and the system parity data CRCd to generate a parity data and may store the main data DQ, the system parity data CRCd, and the parity data in a target page of the memory cell array 310. The parity data generated by the on-die ECC engine 400 may be referred to as a core parity data.

The on-die ECC engine 400, in a read operation, may read the main data DQ, the system parity data CRCd, and the parity data from the target page of the memory cell array 310, may perform an ECC decoding operation on the main data DQ and the system parity data CRCd using the parity data to correct a correctable error in the main data DQ, and the system parity data CRCd, and may provide the main data DQ and the system parity data CRCd to the CRC engine 320.

The CRC engine 320, in the read operation, may generate a second reference system parity data, may generate the first error flag ERR1 associated with errors in the volatile memory cells based on comparison of the system parity data CRCd and the second reference system parity data, and may transmit the first error flag ERR1 to the memory controller 100.

In response to the system parity data CRCd being different from the second reference system parity data, which indicates that uncorrectable errors occur in the volatile memory cells, the CRC engine 320 may transmit the first error flag ERR1 having the first logic level, the main data DQ and the system parity data CRCd to the memory controller 100.

Figure 2:
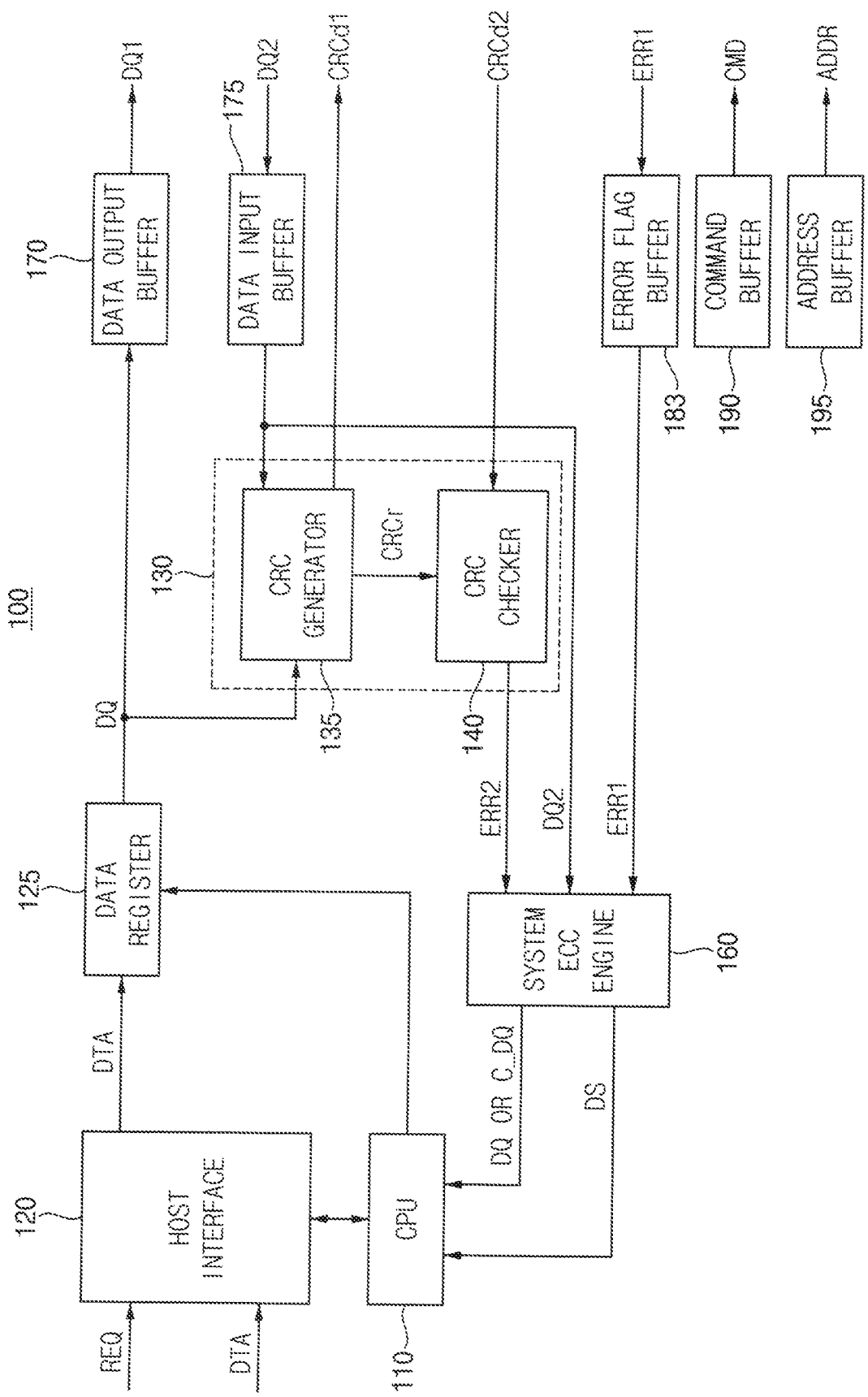
FIG. 2 is block diagram illustrating the memory controller in the memory system of FIG. 1 according to example embodiments.

FIG. 2 is block diagram illustrating an example of the memory controller in the memory system of FIG. 1 according to example embodiments.

Referring to FIG. 2, the memory controller 100 may include the CPU 110, a host interface 120, a data register 125, the CRC engine 130, a system ECC engine 160, a data output buffer 170, a data input buffer 175, an error flag buffer 183, a command buffer 190 and an address buffer 195. The CRC engine 130 may include a CRC generator 135 and a CRC checker 140.

The host interface 120 may receive a request REQ and data DTA from the host and may provide the data DTA to the data register 125.

The data register 125 may store the data DTA and may provide the data DTA as the main data DQ to the data output buffer 170 and the CRC generator 135.

The CRC generator 135, in the write operation, may generate a system parity data CRCd1 based on the main data DQ and may transmit the system parity data CRCd1 to the semiconductor memory device 200. The data output buffer 170 may transmit a main data DQ1 to the semiconductor memory device 200 while the system parity data CRCd1 is transmitted to the semiconductor memory device 200.

The data input buffer 175, in a read operation, may receive a main data DQ2 from the semiconductor memory device 200 and may provide the main data DQ2 to the CRC generator 135 and the system ECC engine 160.

The CRC generator 135, in the read operation, may generate a reference system parity data CRCr based on the main data DQ2 and may provide the reference system parity data CRCr to the CRC checker 140.

The CRC checker 140 may compare a system parity data CRCd2 received from the semiconductor memory device 200 with the reference system parity data CRCr, may generate a second error flag ERR2 associated with transmission error, and may provide the second error flag ERR2 to the system ECC engine 160. In response to system parity data CRCd2 being different from the reference system parity data CRCr, which indicates that transmission errors occur during the read operation, the CRC checker 140 may output the second error flag ERR2 having the first logic level.

The error flag buffer 183 may receive the first error flag ERR1 from the semiconductor memory device 200 and may provide the first error flag ERR1 to the system ECC engine 160.

The system ECC engine 160 may generate a decision signal DS indicating a type of error based on the first error flag ERR1 in the write operation, may generate the decision signal DS based on the first error flag ERR1 and the second error flag ERR2 in the read operation, and may provide the decision signal DS to the CPU 110. In addition, the system ECC engine 160, in the read operation, may receive the main data DQ2, may correct a correctable error in the main data DQ2 based on the first error flag ERR1 and the second error flag ERR2, and may provide a corrected main data C_DQ or the main data DQ to the CPU 110.

The CPU 110 may determine a type of the uncorrectable errors in the corrected main data C_DQ or the main data DQ based on the decision signal DS. That is, the CPU 110 may determine a type of the uncorrectable errors in the corrected main data C_DQ or the main data DQ based on the first error flag ERR1 and the second error flag ERR2.

The command buffer 190 may store the command CMD corresponding to the request REQ and may transmit the command CMD to the semiconductor memory device 200 under control of the CPU 110. The address buffer 195 may store the address ADDR and may transmit the address ADDR to the semiconductor memory device 200 under control of the CPU 110.

Although not illustrated, the memory controller 100 may further include a data inversion decision circuit and a data inversion circuit. In this case, the semiconductor memory device 200 may further include circuits corresponding to the data inversion decision circuit and the data inversion circuit. As used herein, a circuit may include hardware, software, and/or a combination thereof and may include various components such as processors and/or memories.

The data inversion decision circuit may count a number of first data bits having a second logic level, in each unit data of the main data DQ provided from the data register 125, and may provide a decision signal indicating whether to invert each unit data, based on the counting.

The data inversion circuit may selectively invert the unit data to provide the main data DQ in response to the decision signal. For example, when the second logic level is a logic low level ('0'), the data inversion decision circuit may output the decision signal with the second logic level to the data inversion circuit when a number of the first data bits in each unit data is greater than a number of second data bits having first logic level. When the data inversion circuit receives the decision signal having the second logic level, the data inversion circuit may invert data bits of corresponding unit data. The data inversion decision circuit may output the decision signal for each of the unit data as data bus inversion (DBI) bits.

DBI is a technique for current reduction in which, to reduce consumption of a large amount of current in transmission lines terminated with a power voltage while transmitting a low-level signal, as compared with a high-level signal, if data includes a larger number of low-level bits than high-level bits, the data is converted to include half or less low-level bits of a total bits number, with additional transmission of a signal indicating the data conversion, thereby reducing current consumption.

The CRC generator 135 may generate the system parity data CRCd based on the main data DQ and the DBI bits in the write operation, and may generate the reference system parity data CRCr based on the main data DQ and the DBI bits in the read operation.

Figure 3:
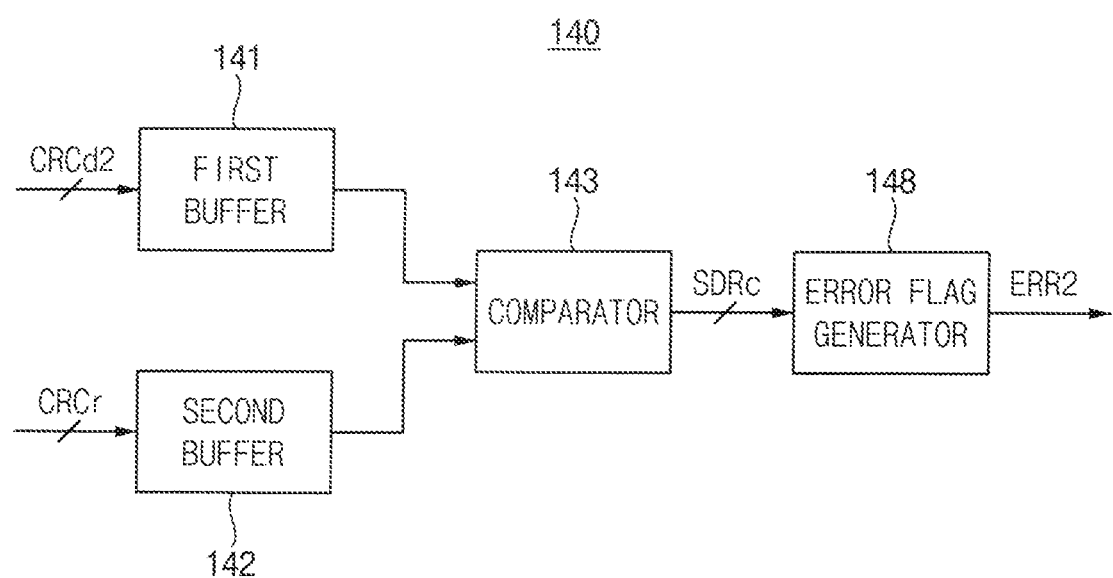
FIG. 3 is a block diagram of the CRC checker in the memory controller of FIG. 2 according to example embodiments.

FIG. 3 is a block diagram of the CRC checker 140 in the memory controller of FIG. 2 according to example embodiments.

Referring to FIG. 3, the CRC checker 140 may include a first buffer 141, a second buffer 142, a comparator 143, and an error flag generator 148.

The first buffer 141 may store the system parity data CRCd2. The second buffer 142 may store the reference system parity data CRCr. The comparator 143 may receive the system parity data CRCd2 from the first buffer 141, may receive the reference system parity data CRCr from the second buffer 142, may compare the system parity data CRCd2 with the reference system parity data CRCr and may generate a syndrome data SDRc indicating whether the system parity data CRCd2 matches the reference system parity data CRCr based on the comparison. The error flag generator 148 may generate the second error flag ERR2 indicating that the data received in the read operation includes errors based on the syndrome data SDRc.

Figure 4:
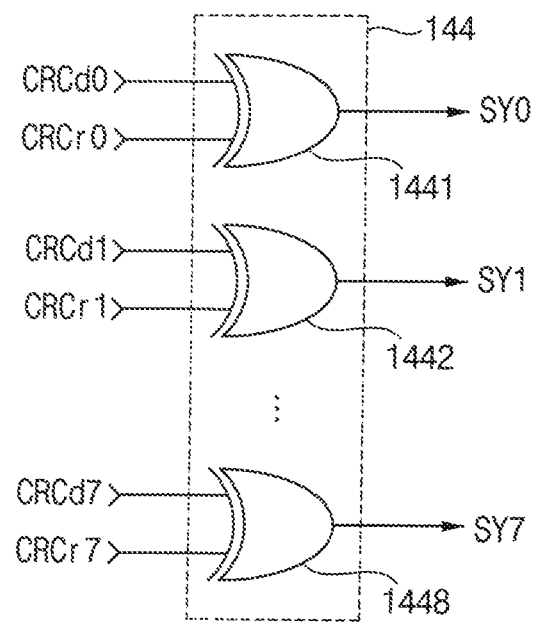
FIG. 4 is a circuit diagram illustrating an example of the comparator in FIG. 3 according to example embodiments.
Figure 4:
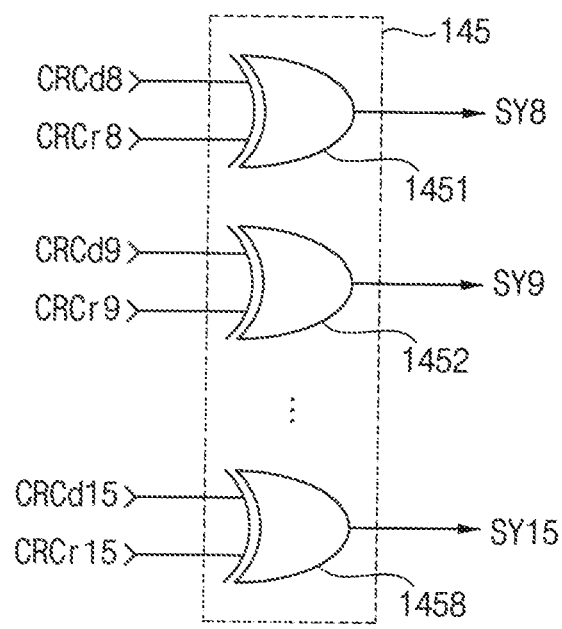

FIG. 4 is a circuit diagram illustrating an example of the comparator in FIG. 3 according to example embodiments.

Referring to FIG. 4, the comparator 143 may include a first comparison block 144 and a second comparison block 145.

The first comparison block 144 may include a plurality of XOR gates 1441~1448 and the second comparison block 145 may include a plurality of XOR gates 1451~1458. The XOR gates 1441~1448 perform XOR operation on corresponding bits of bits CRCd0~CRCd7 of the system parity data CRCd2 and bits CRCr0~CRCr7 of the reference system parity data CRCr and output corresponding syndrome bits SY0~SY7 of the syndrome data SDRc. The XOR gates 1451~1458 perform XOR operation on corresponding bits of bits CRCd8~CRCd15 of the system parity data CRCd2 and bits CRCr8~CRCr15 of the reference system parity data CRCr and output corresponding syndrome bits SY8~SY15 of the syndrome data SDRc.

Figure 5:
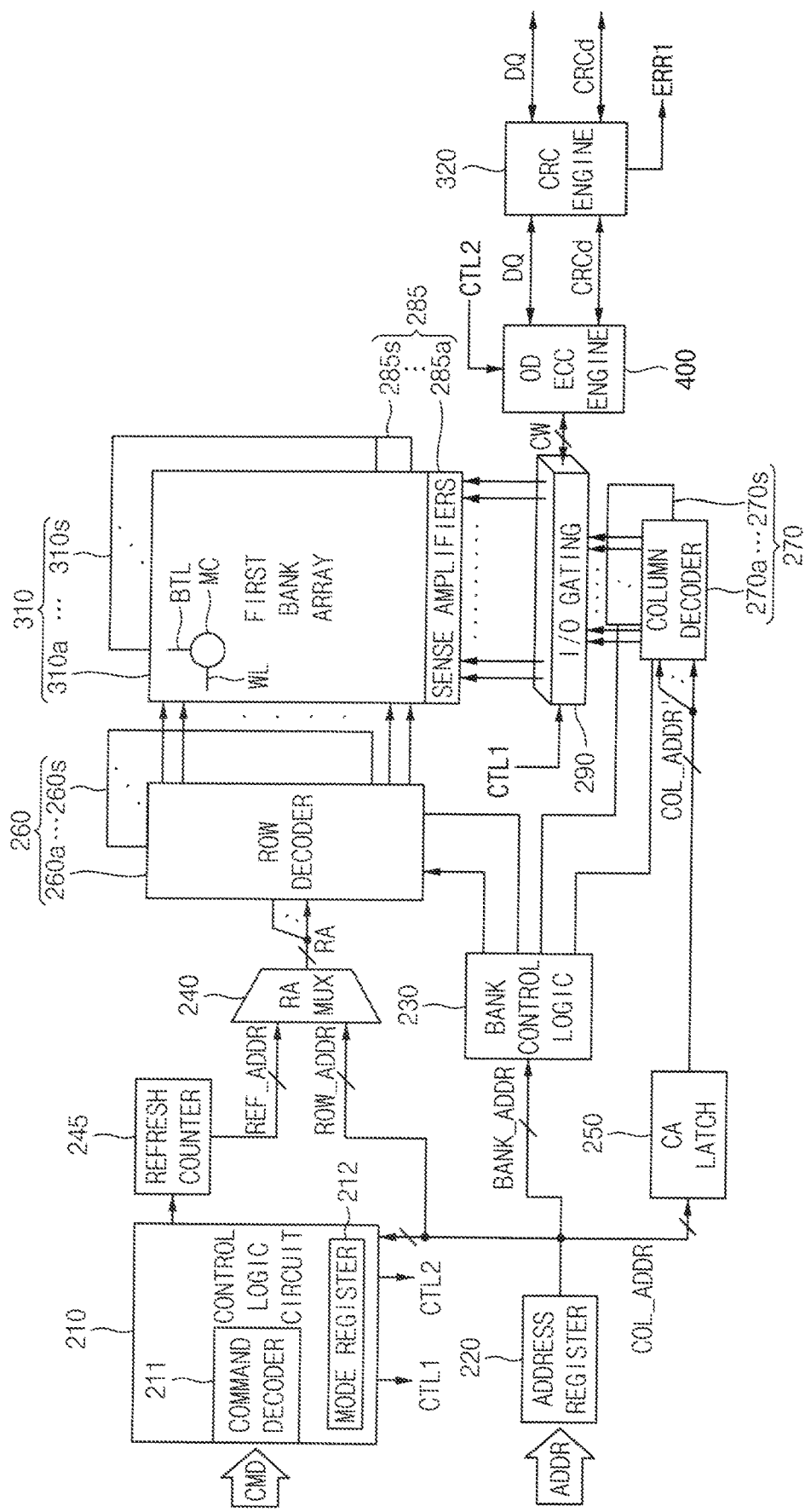
FIG. 5 is a block diagram illustrating an example of the semiconductor memory device in the memory system of FIG. 1 according to example embodiments.

FIG. 5 is a block diagram illustrating an example of the semiconductor memory device in the memory system of FIG. 1 according to example embodiments.

Referring to FIG. 5, the semiconductor memory device 200 may include the control logic circuit 210, an address register 220, a bank control logic 230, a refresh counter 245, a row address multiplexer (RA MUX) 240, a column address (CA) latch 250, a row decoder 260, a column decoder 270, the memory cell array 310, sense amplifiers 285, an input/output (I/O) gating circuit 290, the on-die ECC engine 400 and the CRC engine 320.

The memory cell array 310 may include first through sixteenth bank arrays 310a~310s. The row decoder 260 may include first through sixteenth row decoders 260a~260s respectively coupled to the first through sixteenth bank arrays 310a~310s, the column decoder 270 may include first through sixteenth column decoders 270a~270s respectively coupled to the first through sixteenth bank arrays 310a~310s, and the sense amplifiers 285 may include first through sixteenth sense amplifiers 285a~285s respectively coupled to the first through sixteenth bank arrays 310a~310s.

The first through sixteenth bank arrays 310a~310s, the first through sixteenth row decoders 260a~260s, the first through sixteenth column decoders 270a~270s and first through sixteenth sense amplifiers 285a~285s may form first through sixteenth banks.

Each of the first through sixteenth bank arrays 310a~310s includes a plurality of memory cells MC formed at intersections of a plurality of word-lines WL and a plurality of bit-line BTL.

The address register 220 may receive the address ADDR including a bank address BANK_ADDR, a row address ROW_ADDR and a column address COL_ADDR from the memory controller 100. The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to the bank address BANK_ADDR. One of the first through sixteenth row decoders 260a~260s corresponding to the bank address BANK_ADDR is activated in response to the bank control signals, and one of the first through sixteenth column decoders 270a~270s corresponding to the bank address BANK_ADDR is activated in response to the bank control signals.

The row address multiplexer 240 may receive the row address ROW_ADDR from the address register 220, and may receive a refresh row address REF_ADDR from the refresh counter 245. The row address multiplexer 240 may selectively output the row address ROW_ADDR or the refresh row address REF_ADDR as a row address RA. The row address RA that is output from the row address multiplexer 240 is applied to the first through sixteenth row decoders 260a~260s.

The refresh counter 245 may sequentially increase or decrease the refresh row address REF_ADDR under control of the control logic circuit 210.

The activated one of the first through sixteenth row decoders 260a~260s, by the bank control logic 230, may decode the row address RA that is output from the row address multiplexer 240, and may activate a word-line corresponding to the row address RA. For example, the activated bank row decoder applies a word-line driving voltage to the word-line corresponding to the row address.

The column address latch 250 may receive the column address COL_ADDR from the address register 220, and may temporarily store the received column address COL_ADDR. In some embodiments, in a burst mode, the column address latch 250 may generate column address COL_ADDR' that increment from the received column address COL_ADDR. The column address latch 250 may apply the temporarily stored or generated column address COL_ADDR' to the first through sixteenth column decoders 270a~270s.

The activated one of the first through sixteenth column decoders 270a~270s may activate a sense amplifier corresponding to the bank address BANK_ADDR and the column address COL_ADDR through the I/O gating circuit 290.

The I/O gating circuit 290 may include a circuitry for gating input/output data, and may further include input data mask logic, read data latches for storing data that is output from the first through sixteenth bank arrays 310a~310s, and write drivers for writing data to the first through sixteenth bank arrays 310a~310s.

Codeword CW read from one bank array of the first through sixteenth bank arrays 310a~310s is sensed by a sense amplifier coupled to the one bank array from which the data is to be read, and is stored in the read data latches. The codeword CW stored in the read data latches may be provided to the on-die ECC engine 400. The on-die ECC engine 400 may perform an ECC decoding operation on the codeword CW to provide the main data DQ and the system parity data CRCd to the CRC engine 320.

The CRC engine 320 may generate the second reference system parity data based on the main data DQ, may compare the system parity data CRCd and the second reference system parity data, may generate the first error flag ERR1 based on the comparison and may transmit the main data DQ, the system parity data CRCd and the first error flag ERR1 to the memory controller 100.

The main data DQ and the system parity data CRCd to be written in one bank array of the first through sixteenth bank arrays 310a~310s in the write operation, may be provided to the CRC engine 320 from the memory controller 100.

The CRC engine 320 may generate the first reference system parity data based on the main data DQ, may compare the system parity data CRCd and the first reference system parity data, may transmit the first error flag ERR1 having a first logic level to the memory controller 100 in response to the system parity data CRCd being different from the first reference system parity data and may receive the main data DQ and the system parity data CRCd again from the memory controller 100.

In response to the system parity data CRCd matching the first reference system parity data, the CRC engine 320 may provide the main data DQ and the system parity data CRCd to the on-die ECC engine 400.

The on-die ECC engine 400 may perform an ECC encoding operation on the main data DQ and the system parity data CRCd to generate the parity data, and may provide the codeword CW including the main data DQ, the system parity data CRCd, and the parity data to the I/O gating circuit 290.

The on-die ECC engine 400, in the read operation, may perform an ECC decoding operation on the codeword CW read from a target page to correct a correctable error in the main data DQ, and the system parity data CRCd and may provide the main data DQ and the system parity data CRCd to the CRC engine 320.

The control logic circuit 210 may control operations of the semiconductor memory device 200. For example, the control logic circuit 210 may generate control signals for the semiconductor memory device 200 in order to perform a write operation or a read operation. The control logic circuit 210 may include a command decoder 211 that decodes the command CMD received from the memory controller 100 and a mode register 212 that sets an operation mode of the semiconductor memory device 200.

For example, the command decoder 211 may generate the control signals corresponding to the command CMD by decoding a write enable signal, a row address strobe signal, a column address strobe signal, a chip select signal, etc. The control logic circuit 210 may generate a first control signal CTL1 to control the I/O gating circuit 290 and a second control signal CTL2 to control the on-die ECC engine 400. Although not illustrated, the control logic circuit 210 may generate a third control signal to control the CRC engine 320.

Figure 6:
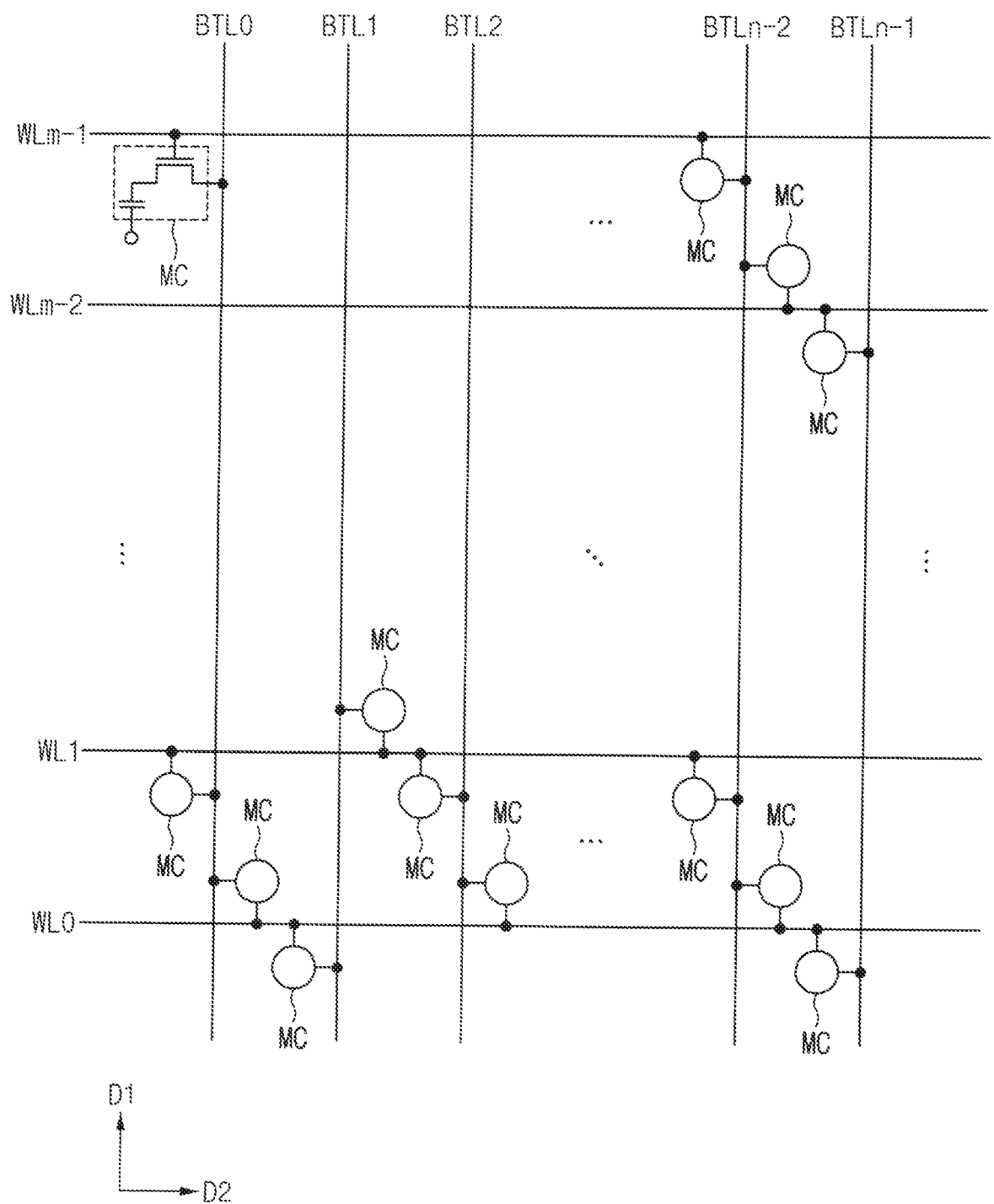
FIG. 6 illustrates an example of the first bank array in the semiconductor memory device of FIG. 5.

FIG. 6 illustrates an example of the first bank array in the semiconductor memory device of FIG. 5.

Referring to FIG. 6, the first bank array 310 may include a plurality of word-lines WL~WLm−1 (where m is an even number equal to or greater than two), a plurality of bit-lines BTL0~BTLn−1 (where n is an even number equal to or greater than two), and a plurality of memory cells MCs disposed at intersections between the word-lines WL0~WLm−1 and the bit-lines BTL0~BTLn−1.

The bit-lines BTL0~BTLn−1 may extend in a first direction D1 and the word-lines WL~WLm−1 may extend in a second direction D2 crossing the first direction D1.

Each of the memory cells MCs includes an access (cell) transistor coupled to one of the word-lines WL0~WLm−1 and one of the bit-lines BTL0~BTLn−1 and a storage (cell) capacitor coupled to the cell transistor. That is, each of the memory cells MCs has a DRAM cell structure.

In addition, the memory cells MCs may have different arrangement depending on that the memory cells MCs are coupled to an even word-line (for example, WL0) or an odd word-line (for example, WL1). That is, a bit-line coupled to adjacent memory cells may be different depending on whether a word-line selected by an access address is an even word-line or an odd word-line. However, embodiments are not limited thereto. The memory cells MCs coupled to the even word-line (for example, WL0) and the odd word-line (for example, WL1) may have the same arrangement.

Figure 7:
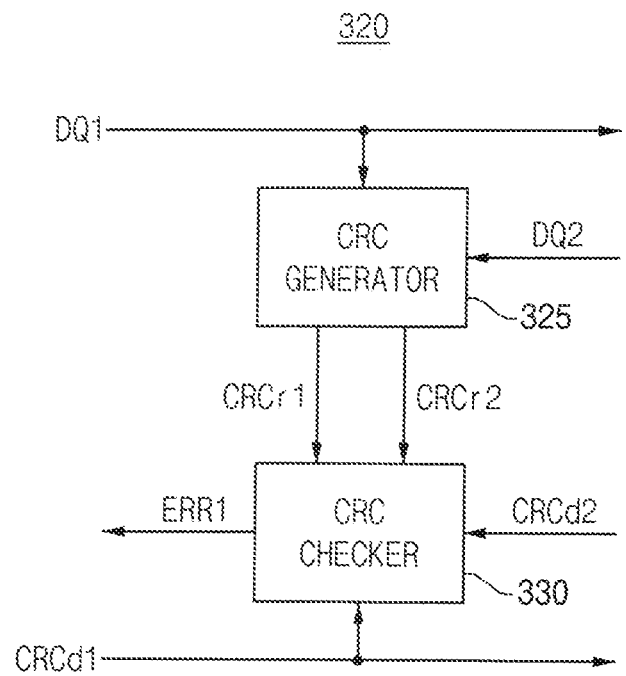
FIG. 7 is a block diagram illustrating an example of the CRC engine in the semiconductor memory device of FIG. 5 according to example embodiments.

FIG. 7 is a block diagram illustrating an example of the CRC engine in the semiconductor memory device of FIG. 5 according to example embodiments.

Referring to FIG. 7, the CRC engine 320 may include a CRC generator 325 and a CRC checker 330.

The CRC generator 325, in the write operation, may receive the main data DQ1 from the memory controller 100, may generate a first reference system parity data CRCr1 based on the main data DQ1, and may provide the first reference system parity data CRCr1 to the CRC checker 330.

The CRC generator 325, in the read operation, may receive the main data DQ2 from the on-die ECC engine 400, may generate a second reference system parity data CRCr2 based on the main data DQ2 and may provide the second reference system parity data CRCr2 to the CRC checker 330.

The CRC checker 330, in the write operation, may receive the system parity data CRCd1 from the memory controller 100, may compare the system parity data CRCd1 and the first reference system parity data CRCr1, may generate the first error flag ERR1 based on the comparison, and may determine a logic level of the first error flag ERR1 based on the comparison. In response to the system parity data CRCd1 being different from the first reference system parity data CRCr1, which indicates that transmission error associated with a link occurs in the write operation, the CRC checker 330 may transmit the first error flag ERR1 having the first logic level to the memory controller 100.

The CRC checker 330, in the read operation, may receive a system parity data CRCd2 from the on-die ECC engine 400, may compare the system parity data CRCd2 and the second reference system parity data CRCr2, may generate the first error flag ERR1 based on the comparison, and may determine a logic level of the first error flag ERR1 based on the comparison. In response to the system parity data CRCd2 being different from the second reference system parity data CRCr2, which indicates that the second type of error associated with the volatile memory cells occurs, the CRC checker 330 may transmit the first error flag ERR1 having the first logic level to the memory controller 100.

Figure 8:
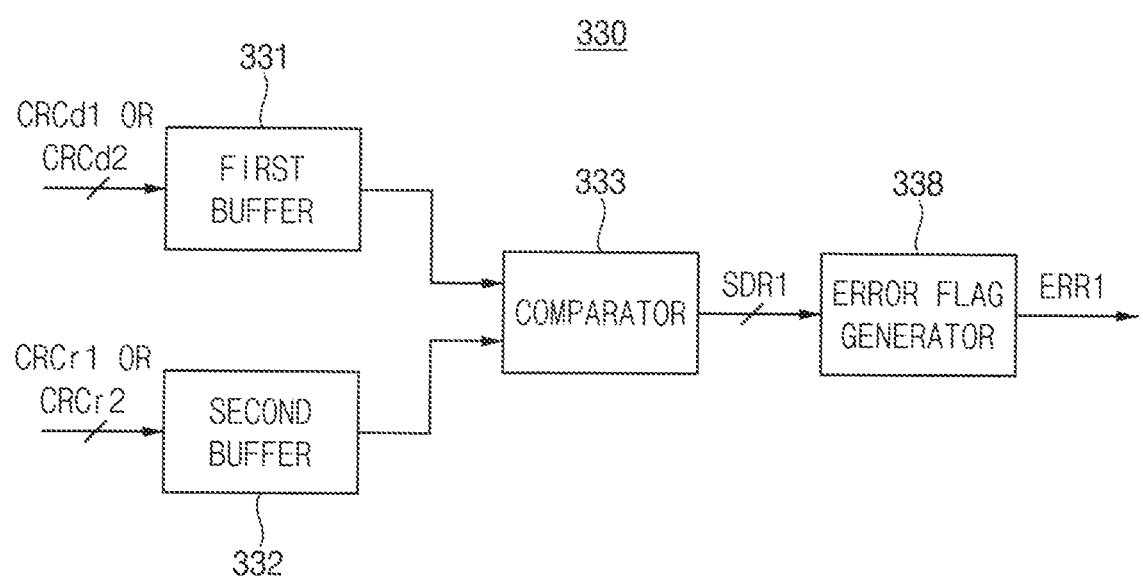
FIG. 8 is a block diagram of the CRC checker in the CRC engine of FIG. 7 according to example embodiments.

FIG. 8 is a block diagram of the CRC checker in the CRC engine of FIG. 7 according to example embodiments.

Referring to FIG. 8, the CRC checker 330 may include a first buffer 331, a second buffer 332, a comparator 333 and an error flag generator 348.

The first buffer 331 may store the system parity data CRCd1 or CRCd2. The second buffer 332 may store the reference system parity data CRCr1 or CRCr2. The comparator 333, in the write operation, may receive the system parity data CRCd1 from the first buffer 331, may receive the first reference system parity data CRCr1 from the second buffer 332, may compare the system parity data CRCd1 with the first reference system parity data CRCr1, and may generate a syndrome data SDR1 indicating whether the system parity data CRCd1 matches the first reference system parity data CRCr1 based on the comparison. The comparator 333, in the read operation, may receive the system parity data CRCd2 from the first buffer 331, may receive the second reference system parity data CRCr2 from the second buffer 332, may compare the system parity data CRCd2 with the second reference system parity data CRCr1, and may generate the syndrome data SDR1 indicating whether the system parity data CRCd2 matches the second reference system parity data CRC21 based on the comparison.

The error flag generator 338 may generate the first error flag ERR1 indicating that the first type of error occurs in the write operation and may generate the first error flag ERR1 indicating that the second type of error occurs in the read operation based on the syndrome data SDR1.

Figure 9:
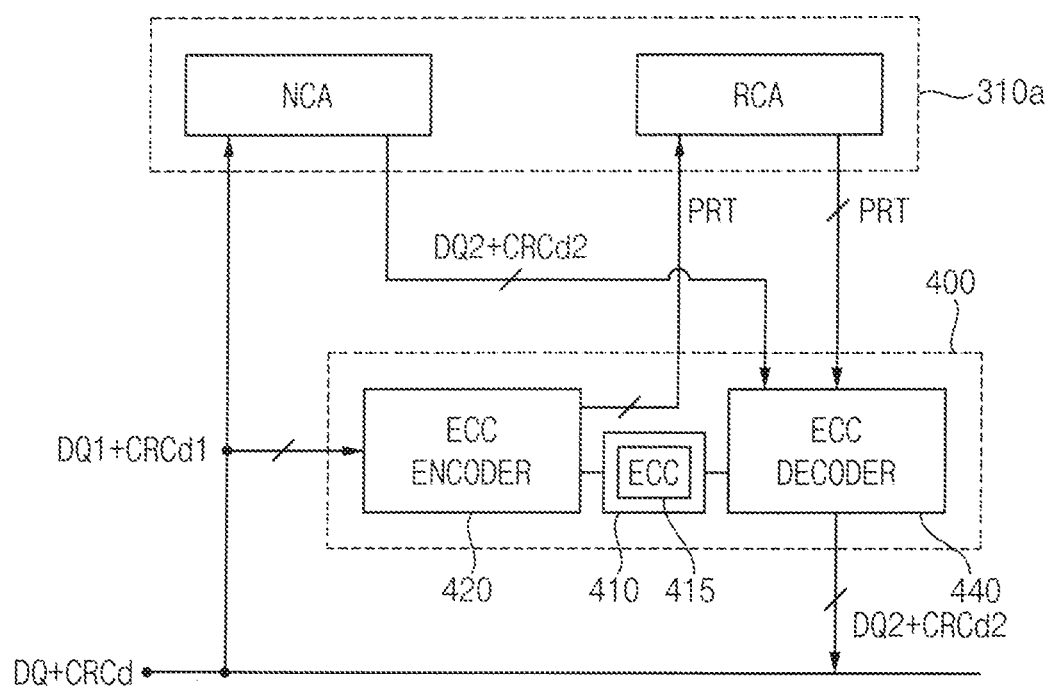
FIG. 9 is a block diagram illustrating an example of the in-die ECC engine in the semiconductor memory device of FIG. 5 according to example embodiments.

FIG. 9 is a block diagram illustrating an example of the in-die ECC engine in the semiconductor memory device of FIG. 5 according to example embodiments.

In FIG. 9, the first bank array 310a is also illustrated for convenience of explanation. The first bank array 310a may include a normal cell region NCA and a redundancy cell region RCA.

Referring to FIG. 9, the on-die ECC engine 400 may include an ECC memory 410, an ECC encoder 420 and an ECC decoder 440. The ECC encoder 420 and/or the ECC decoder 440 may be circuits that include hardware, software, or a combination thereof.

The ECC memory 410 may store a ECC 415 and the ECC encoder 420 and the ECC decoder 440 may be connected to the ECC memory 410. The ECC 420 may be represented as a H matrix for generating a parity data based on the main data DQ and the system parity data CRCd. The ECC 415 may a single error correction (SEC) code or a single error correction/double error detection (SECDED) code, however, embodiments are not limited thereto.

The ECC encoder 420 may perform an ECC encoding operation on the main data DQ1 and the system parity data CRCd1, to be stored in the normal cell region NCA, to generate a parity data PRT for detecting and/or correcting errors occurring in the volatile memory cells by using the ECC 415. The parity data PRT may be stored in the redundancy cell region RCA. The parity data PRT may include 10 bits, however, embodiments are not limited thereto. The parity data PRT may be referred to as a core parity data.

The ECC decoder 440 is connected to the ECC memory 410, may perform an ECC decoding operation on the main data DQ2 and the system parity data CRCd2 read from the first bank array 310a based on the parity data PRT read from the first bank array 310a by using the ECC 415 to correct a correctable error in the main data DQ2 and the system parity data CRCd2, and may provide the main data DQ2 and the system parity data CRCd2 to the CRC engine 320 in FIG. 7.

The ECC decoder 440 may generate check bits based on the main data DQ2 and the system parity data CRCd2 read from the first bank array 310a by using the ECC 415, may compare the check bits and the parity data PRT read from the first bank array 310a, and may correct a correctable error in the main data DQ2 and the system parity data CRCd2 based on a result of the comparison.

Figure 10:
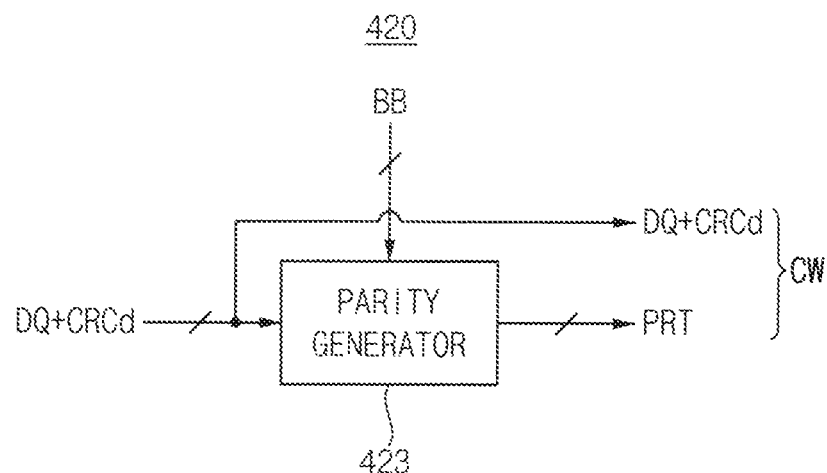
FIG. 10 illustrates an example of the ECC encoder in the on-die ECC engine of FIG. 9 according to example embodiments.

FIG. 10 illustrates an example of the ECC encoder in the on-die ECC engine of FIG. 9 according to example embodiments.

Referring to FIG. 10, the ECC encoder 420 may include a parity generator 423. The parity generator 423 receives the main data DQ, the system parity data CRCd, and a basis bit BB and generates the parity data PRT by performing, for example, an XOR array operation. The basis bit BB may be one or more bits for generating the parity data PRT with respect to the main data DQ. Since the system parity data CRCd may include b'0000000, the basis bit BB may include other particular bits instead of b'0000000.

Figure 11:
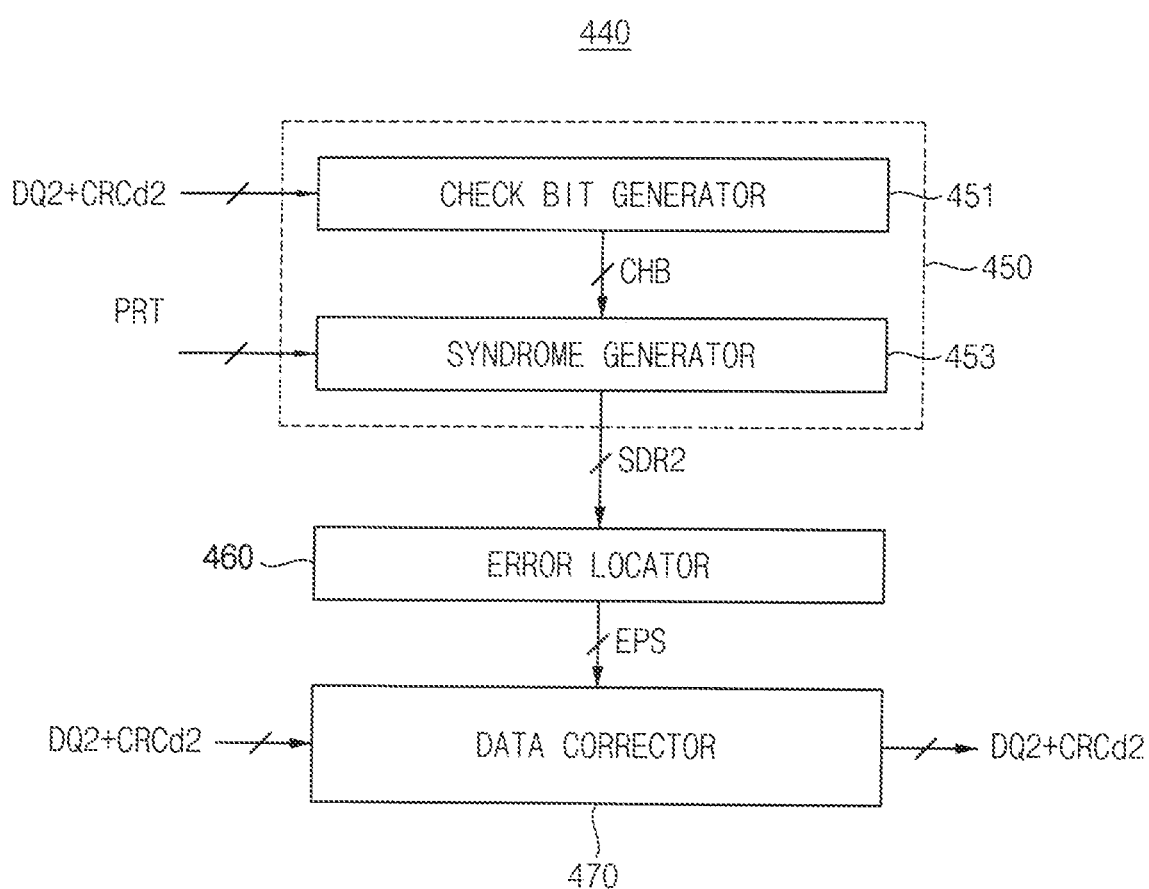
FIG. 11 illustrates an example of the ECC decoder in the on-die ECC engine of FIG. 9 according to example embodiments.

FIG. 11 illustrates an example of the ECC decoder in the on-die ECC engine of FIG. 9 according to example embodiments.

Referring to FIG. 11, the ECC decoder 440 may include a syndrome generation circuit 450, an error locator 460, and a data corrector 470.

The syndrome generation circuit 450 may include a check bit generator 451 and a syndrome generator 453.

The check bit generator 451 may generate check bits CHB based on the main data DQ and the system parity data CRCd read from the target page by performing an XOR array operation and the syndrome generator 453 may generate a syndrome data SDR2 by comparing corresponding bits of the parity data PRT and the check bits CHB.

The error locator 460 may generate an error position signal EPS indicating a position of an error bit (a correctable error) in the main data DQ and the system parity data CRCd to provide the error position signal EPS to the data corrector 470 when all bits of the syndrome data SDR2 data are not 'zero'.

The data corrector 470 may receive the main data DQ and the system parity data CRCd may correct the correctable error in the main data DQ and the system parity data CRCd based on the error position signal EPS when the main data DQ and the system parity data CRCd includes the correctable error, and may provide the main data DQ and the system parity data CRCd to the CRC engine 320 in FIG. 7. The syndrome generation circuit 450, check bit generator 451, error locator 460, and/or data corrector 470 may be circuits that include hardware, software, or a combination thereof.

Figure 12:
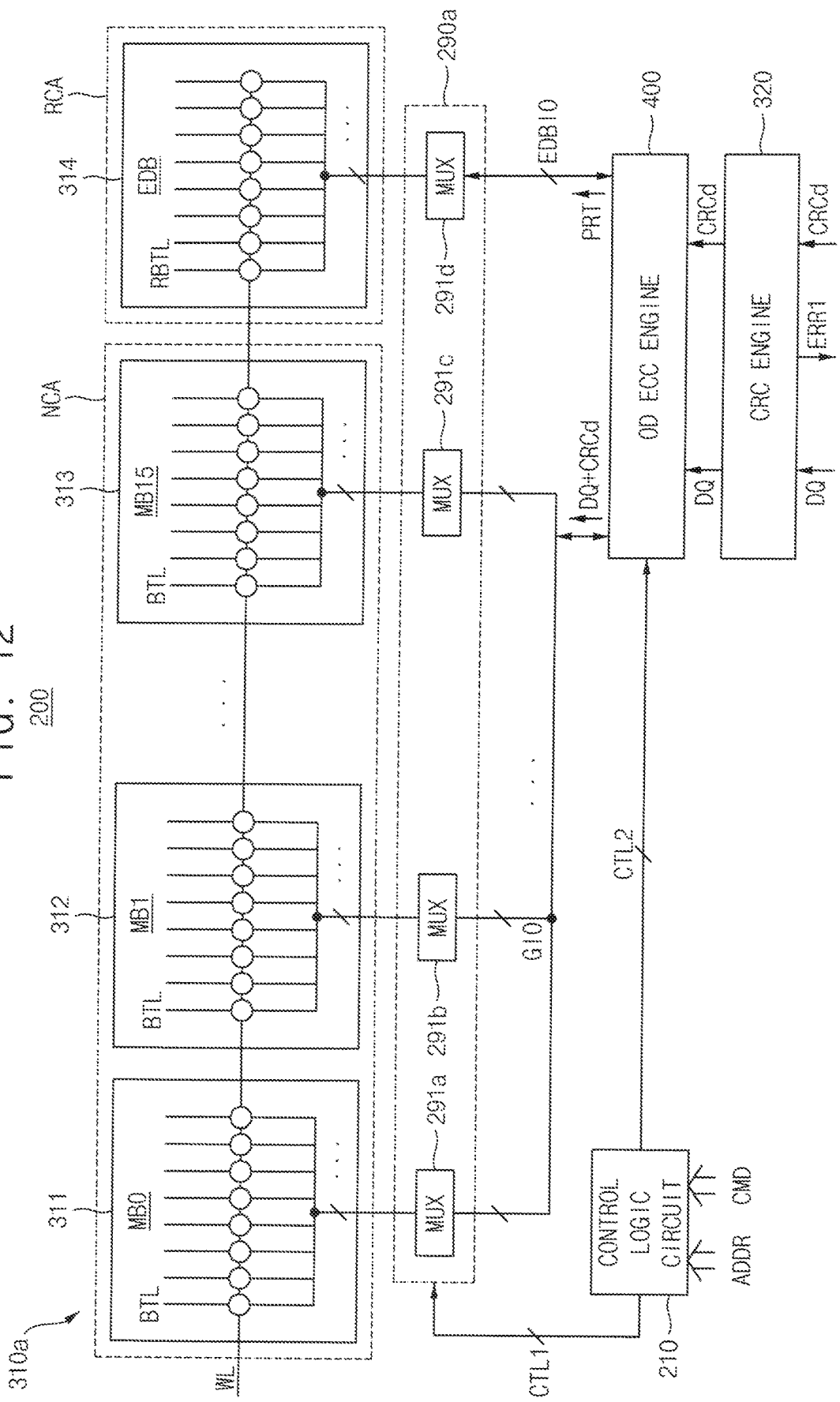
FIG. 12 illustrates a portion of the semiconductor memory device of FIG. 5 in a write operation.

FIG. 12 illustrates a portion of the semiconductor memory device of FIG. 5 in a write operation.

In FIG. 12, the control logic circuit 210, the first bank array 310a, the I/O gating circuit 290a, the on-die ECC engine 400 and the CRC engine 320 are illustrated.

Referring to FIG. 12, the first bank array 310a may include the normal cell region NCA and the redundancy cell region RCA. The normal cell region NCA includes a plurality of first memory blocks MB0~MB15, i.e., 311~313, and the redundancy cell region RCA includes at least a second memory block 314. The first memory blocks 311~313 are memory blocks determining a memory capacity of the semiconductor memory device 200. The second memory block 314 is for ECC and/or redundancy repair. Since the second memory block 314 for ECC and/or redundancy repair is used for ECC, data line repair and block repair to repair 'fail' cells generated in the first memory blocks 311~313, the second memory block 314 is also referred to as an EDB block.

In each of the first memory blocks 311~313, a plurality of first memory cells are arranged in rows and columns. In the second memory block 314, a plurality of second memory cells are arranged in rows and columns. The first memory cells connected to intersections of the word-lines WL and the bit-lines BTL may be volatile (dynamic) memory cells.

The second memory cells connected to intersections of the word-lines WL and bit-lines RBTL may be dynamic memory cells.

The I/O gating circuit 290a includes a plurality of switching circuits 291a~291d respectively connected to the first memory blocks 311~313 and the second memory block 314. In the semiconductor memory device 200, bit-lines corresponding to data of a burst length (BL) may be simultaneously accessed to support the BL indicating the maximum number of column positions that are accessible.

The on-die ECC engine 400 may be connected to the switching circuits 291a~291d through first data lines GIO and second data lines EDBIO.

The control logic circuit 210 may receive the command CMD and the address ADDR and may decode the command CMD to generate the first control signal CTL1 for controlling the switching circuits 291a-291d and the second control signal CTL2 for controlling the on-die ECC engine 400.

When the command CMD is a write command, the CRC engine 320 may receive the main data DQ and the system parity data CRCd from the memory controller 100, may generate the first reference system parity data based on the main data DQ, and may compare the system parity data CRCd and the first reference system parity data.

In response to the system parity data CRCd being different from the first reference system parity data based on a result of the comparison, the CRC engine 320 may transmit the first error flag ERR1 with a first logic level to the memory controller 100 and may receive the main data DQ and the system parity data CRCd from the memory controller 100.

In response to the system parity data CRCd matching the first reference system parity data based on a result of the comparison, the CRC engine 320 may provide the main data DQ and the system parity data CRCd to the on-die ECC engine 400.

When the command CMD is a write command, the control logic circuit 210 may provide the second control signal CTL2 to the on-die ECC engine 400. The on-die ECC engine 400, in response to the second control signal CTL2, may perform an ECC encoding operation on the main data DQ and the system parity data CRCd to generate the parity data PRT and may provide the codeword CW including the main data DQ, the system parity data CRCd, and the parity data PRT to the I/O gating circuit 290.

The control logic circuit 210 may provide the first control signal CTL1 to the I/O gating circuit 290 such that the main data DQ and the system parity data CRCd are to be stored in the normal cell region NCA of the target page in the first bank array 310a and the parity data PRT is to be stored the redundancy cell region RCA of the target page in the first bank array 310a.

Figure 13:
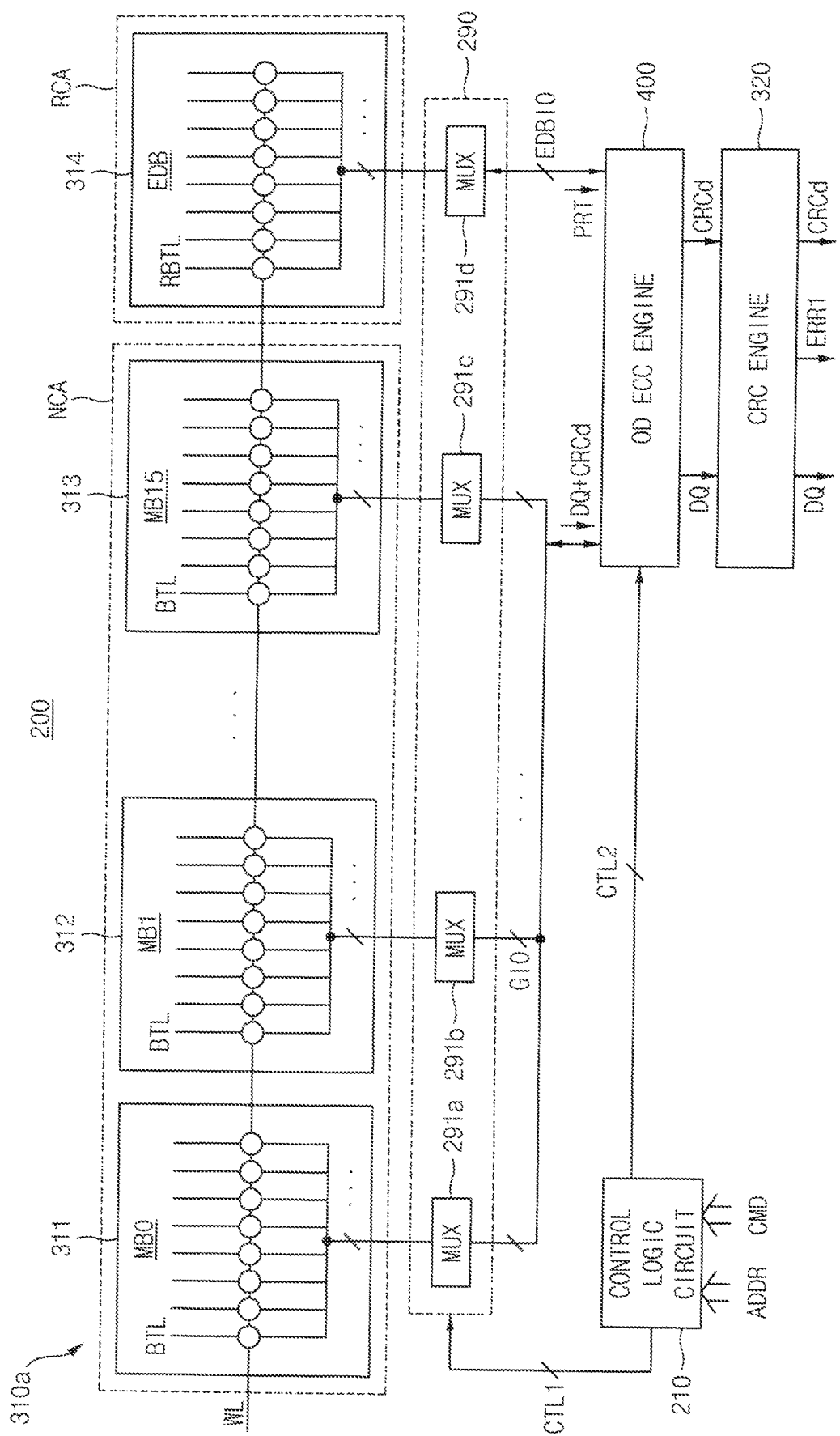
FIG. 13 illustrates a portion of the semiconductor memory device of FIG. 5 in a read operation.

FIG. 13 illustrates a portion of the semiconductor memory device of FIG. 5 in a read operation.

In FIG. 13, the control logic circuit 210, the first bank array 310a, the I/O gating circuit 290, the on-die ECC engine 400 and the CRC engine 320 are illustrated as in FIG. 12.

Referring to FIG. 13, when the command CMD is a read command to designate a read operation, the control logic circuit 210 may provide the first control signal CTL1 to the I/O gating circuit 290 such that the main data DQ, the system parity data CRCd and the parity data PRT stored in the target page in the first bank array 310a are provided to the on-die ECC engine 400.

The on-die ECC engine 400, may perform an ECC decoding operation on the main data DQ, the system parity data CRCd using the parity data PRT to correct a correctable error in the main data DQ, and the system parity data CRCd and may provide the main data DQ and the system parity data CRCd to the CRC engine 320.

The CRC engine 320 may generate the second reference system parity data based on the main data DQ, may generate the first error flag ERR1 based on comparison of the system parity data CRCd, and the second reference system parity data and may transmit the main data DQ, the system parity data CRCd, and the first error flag ERR1 to the memory controller 100. In response to the system parity data CRCd being different from the second reference system parity data, which indicates that the second type of error associated with the volatile memory cells occurs, the CRC engine 320 may transmit the first error flag ERR1 having the first logic level to the memory controller 100.

Because, after the on-die ECC engine 400 corrects a correctable error in the main data DQ and system parity data CRCd and provides the main data DQ and system parity data CRCd to the CRC engine 320, the system parity data CRCd being different from the second reference system parity data indicates that uncorrectable errors are included in the main data DQ and the system parity data CRCd which are read from the memory cells. Therefore, the CRC engine 320 may transmit, to the memory controller 100, the first error flag ERR1 having the first logic level indicating that the second type of error occurs.

Figure 14:
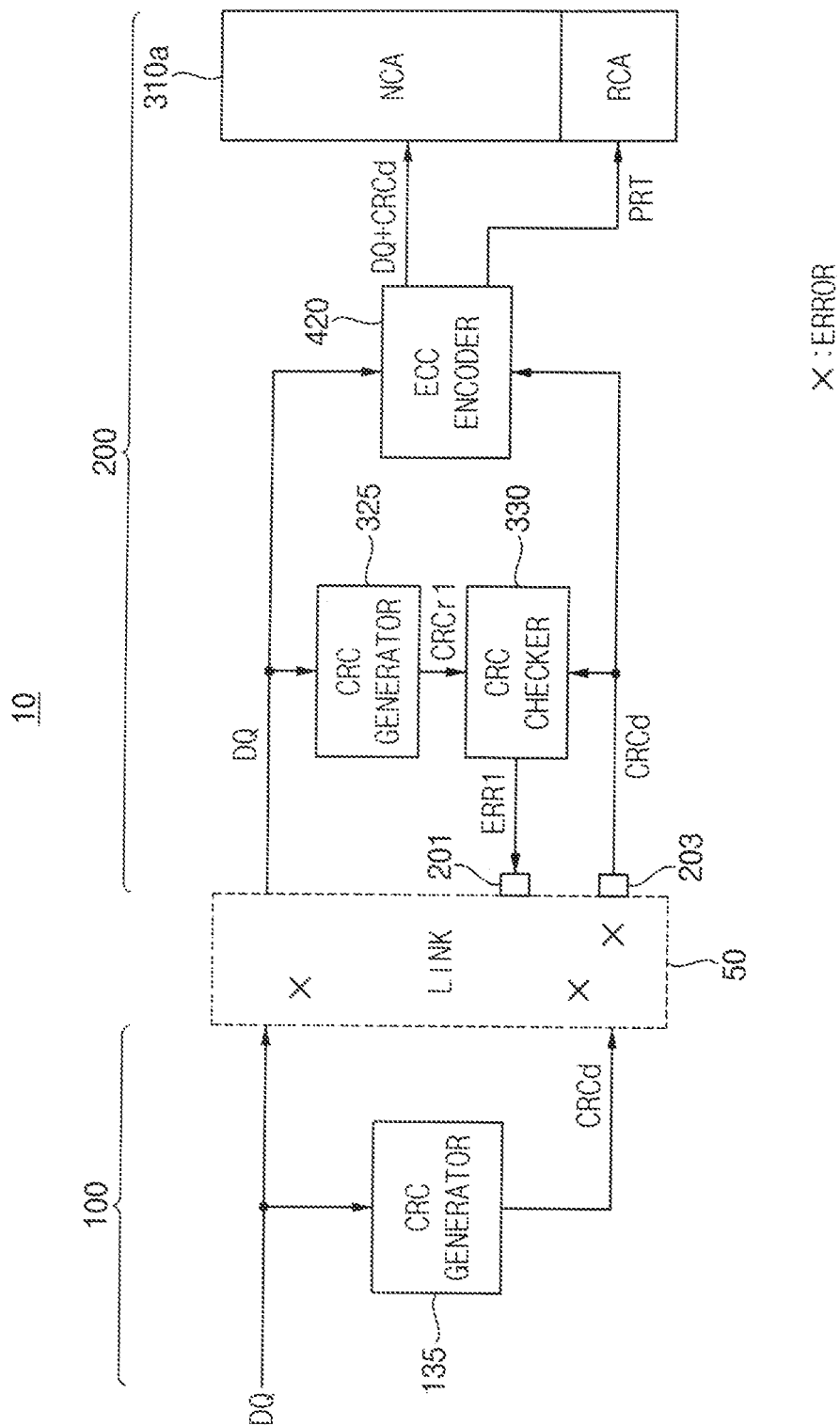
FIG. 14 illustrates the memory system of FIG. 1 in a write operation according to example embodiments.

FIG. 14 illustrates the memory system of FIG. 1 in a write operation according to example embodiments.

Referring to FIGS. 1, 2, 5, 7, 12 and 14, in the write operation, the CRC generator 135 in the memory controller 100 may generate the system parity data CRCd based on the main data DQ to be transmitted to the semiconductor memory device 200.

The memory controller 100 may transmit the main data DQ and the system parity data CRCd to the semiconductor memory device 200 through a link 50.

The link 50 may include a channel such a transmission line which the memory controller 100 and the semiconductor memory device 200 use for communicating each other. The main data DQ and the system parity data CRCd, which are transmitted to the semiconductor memory device 200 from the memory controller 100, may include at least an error due to errors X in the link 50.

The CRC generator 325 in the semiconductor memory device 200 may generate the first reference system parity data CRCr1 based on the main data DQ received through the link 50 and may provide the first reference system parity data CRCr1 to the CRC checker 330.

The CRC checker 330 may compare the system parity data CRCd received through the link 50 with the first reference system parity data CRCr1, may determine a logic level of the first error flag ERR1 based on a result of the comparison, may transmit the first error flag ERR1 having a first logic level to the memory controller 100 in response to the system parity data CRCd being different from the first reference system parity data CRCr1, and may receive the main data DQ and the system parity data CRCd again from the memory controller 100.

In response to the system parity data CRCd matching the first reference system parity data CRCr1, the CRC generator 325 and the CRC checker 330 may provide the main data DQ and the system parity data CRCd to the ECC encoder 420.

The ECC encoder 420 may perform an ECC encoding operation on the main data DQ and the system parity data CRCd to generate the parity data PRT, may store the main data DQ and the system parity data CRCd in the normal cell region NCA of the first bank array 310a and may store the parity data PRT in the redundancy cell region RCA of the first bank array 310a, through the I/O gating circuit 290a in FIG. 12.

Figure 15:
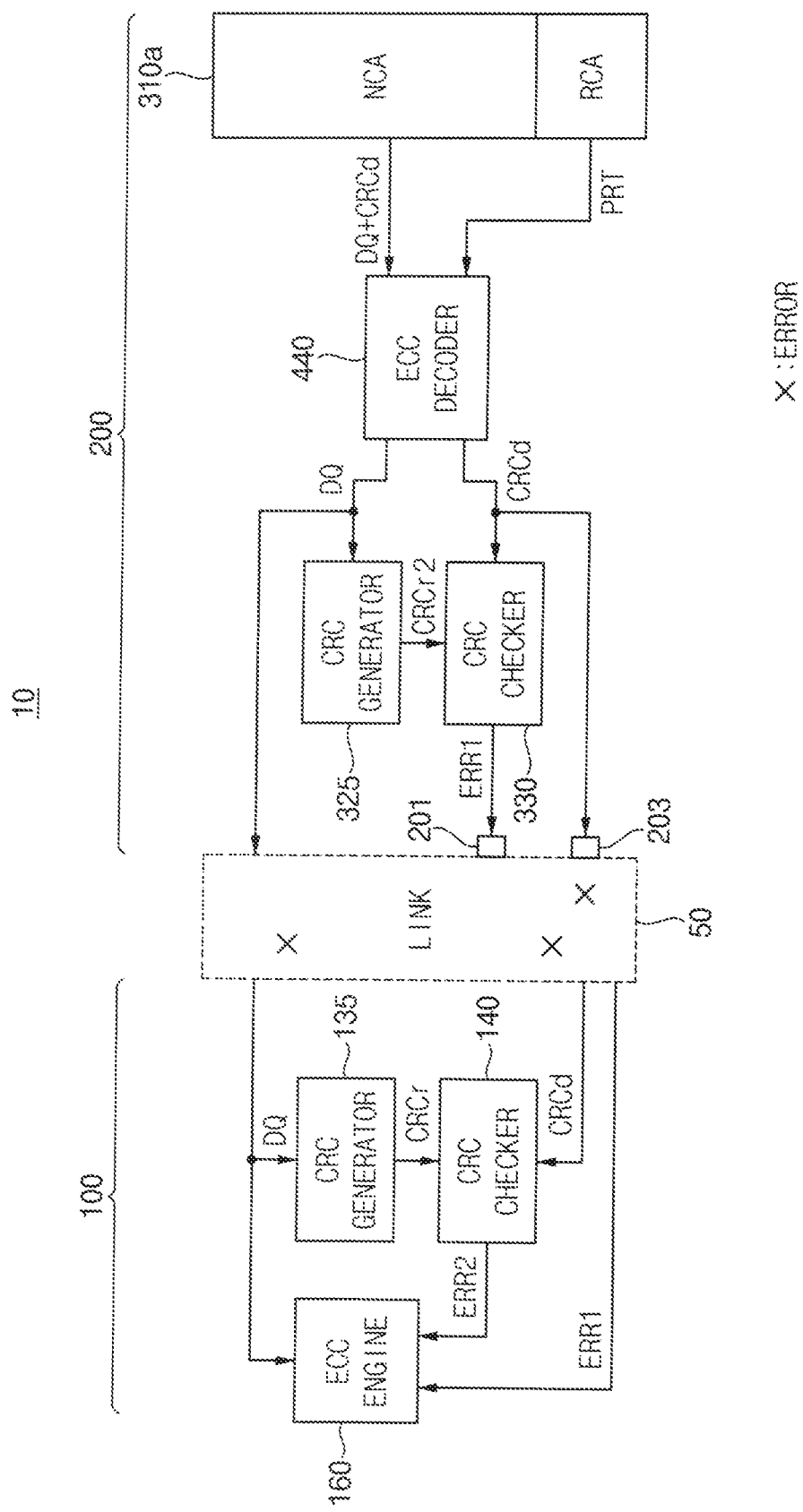
FIG. 15 illustrates the memory system of FIG. 1 in a read operation according to example embodiments.

FIG. 15 illustrates the memory system of FIG. 1 in a read operation according to example embodiments.

Referring to FIGS. 1, 2, 5, 7, 13 and 15, in the read operation, the ECC decoder 440 may read the main data DQ and the system parity data CRCd from the normal cell region NCA of the first bank array 310a, and may read the parity data PRT from the redundancy cell region RCA of the first bank array 310a, through the I/O gating circuit 290 in FIG. 13.

The ECC decoder 440 may perform an ECC decoding operation on the main data DQ and the system parity data CRCd using the parity data PRT to correct a correctable error in the main data DQ and the system parity data CRCd and may provide the main data DQ and the system parity data CRCd to the CRC checker 330.

The CRC generator 325 may generate the second reference system parity data CRCr2 based on the main data DQ and may provide the second reference system parity data CRCr2 to the CRC checker 330.

The CRC checker 330 may compare the system parity data CRCd and the second reference system parity data CRCr2, may generate the first error flag ERR1 based on the comparison, and may determine a logic level of the first error flag ERR1 based on the comparison. In response to the system parity data CRCd being different from the second reference system parity data CRCr2, the CRC checker 330 may transmit the first error flag ERR1 having the first logic level to the memory controller 100 through the link 50 and may transmit the main data DQ and the system parity data CRCd to the memory controller 100 through the link 50.

The CRC generator 135 may generate a reference system parity data CRCr based on the main data DQ received through the link 50 and may provide the reference system parity data CRCr to the CRC checker 140.

The CRC checker 140 in the memory controller 100 may compare a system parity data CRCd received through the link 50 with the reference system parity data CRCr may determine a logic level of the second error flag ERR2 based on the comparison. In response to system parity data CRCd2 being different from the reference system parity data CRCr, the CRC checker 140 may provide the second error flag ERR2 having the first logic level to the system ECC engine 160.

The system ECC engine 160 may receive the first error flag ERR1 and the second error flag ERR2 and may determine a type of error included in the main data DQ received through the link 50 based on the first error flag ERR1 and the second error flag ERR2.

For example, when the first error flag ERR1 has a first logic level and the second error flag ERR2 has a second logic level (e.g., a logic low level), the system ECC engine 160 may determine that the main data DQ includes a second type of error associated with the volatile memory cells.

For example, when the first error flag ERR1 has a second logic level and the second error flag ERR2 has a first logic level, the system ECC engine 160 may determine that the main data DQ includes a first type of error associated with the link 50. That is, the main data DQ may include a transmission error that occurs during the main data DQ being transmitted to the memory controller 100 from the semiconductor memory device 200.

For example, when the first error flag ERR1 has a first logic level and the second error flag ERR2 has a first logic level, the system ECC engine 160 may determine that the main data DQ includes a first type of error associated with the link 50 and a second type of error associated with the volatile memory cells.

Figure 16:
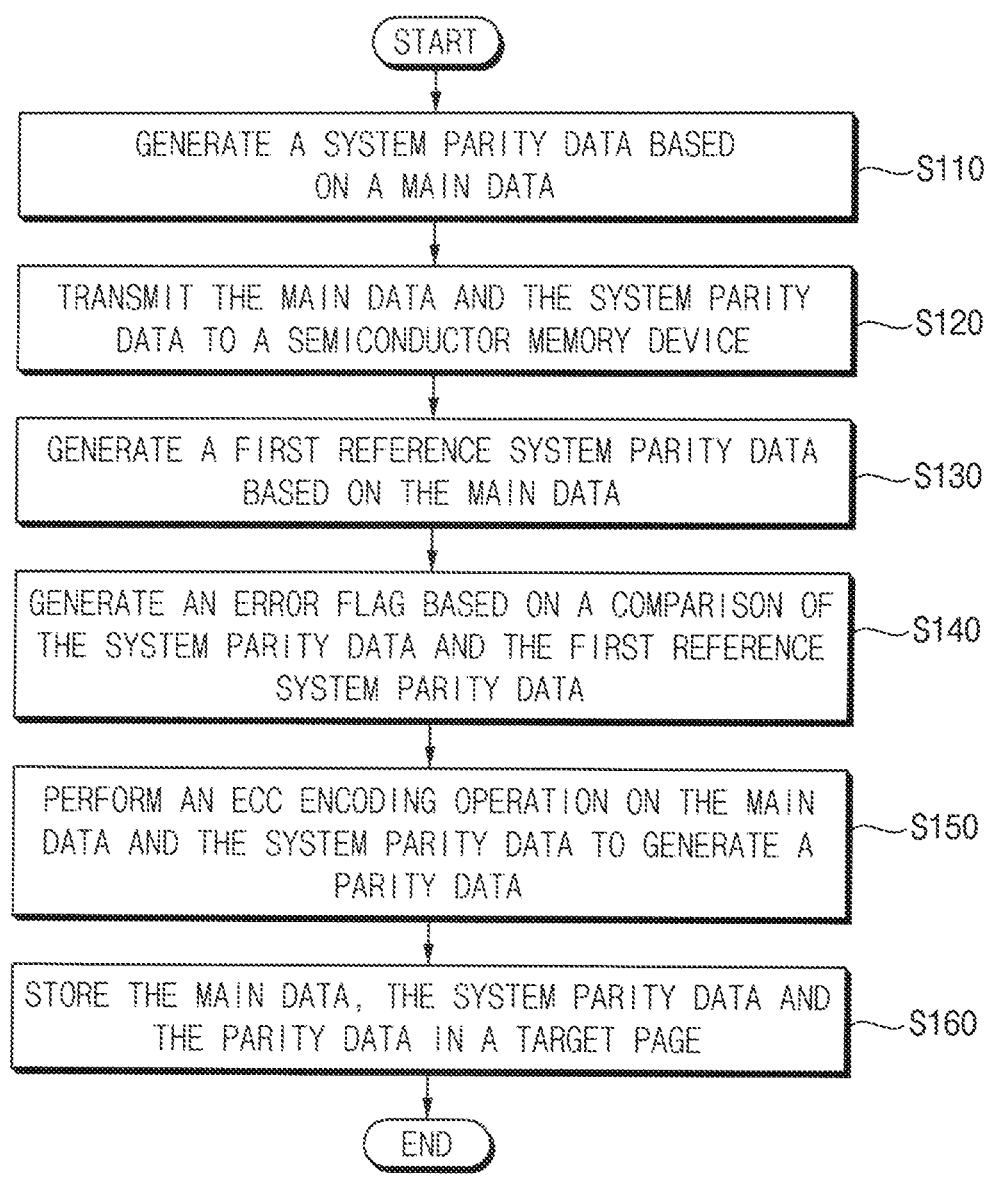
FIG. 16 is a flow chart illustrating a method of operating a memory system according to example embodiments.
Figure 17:
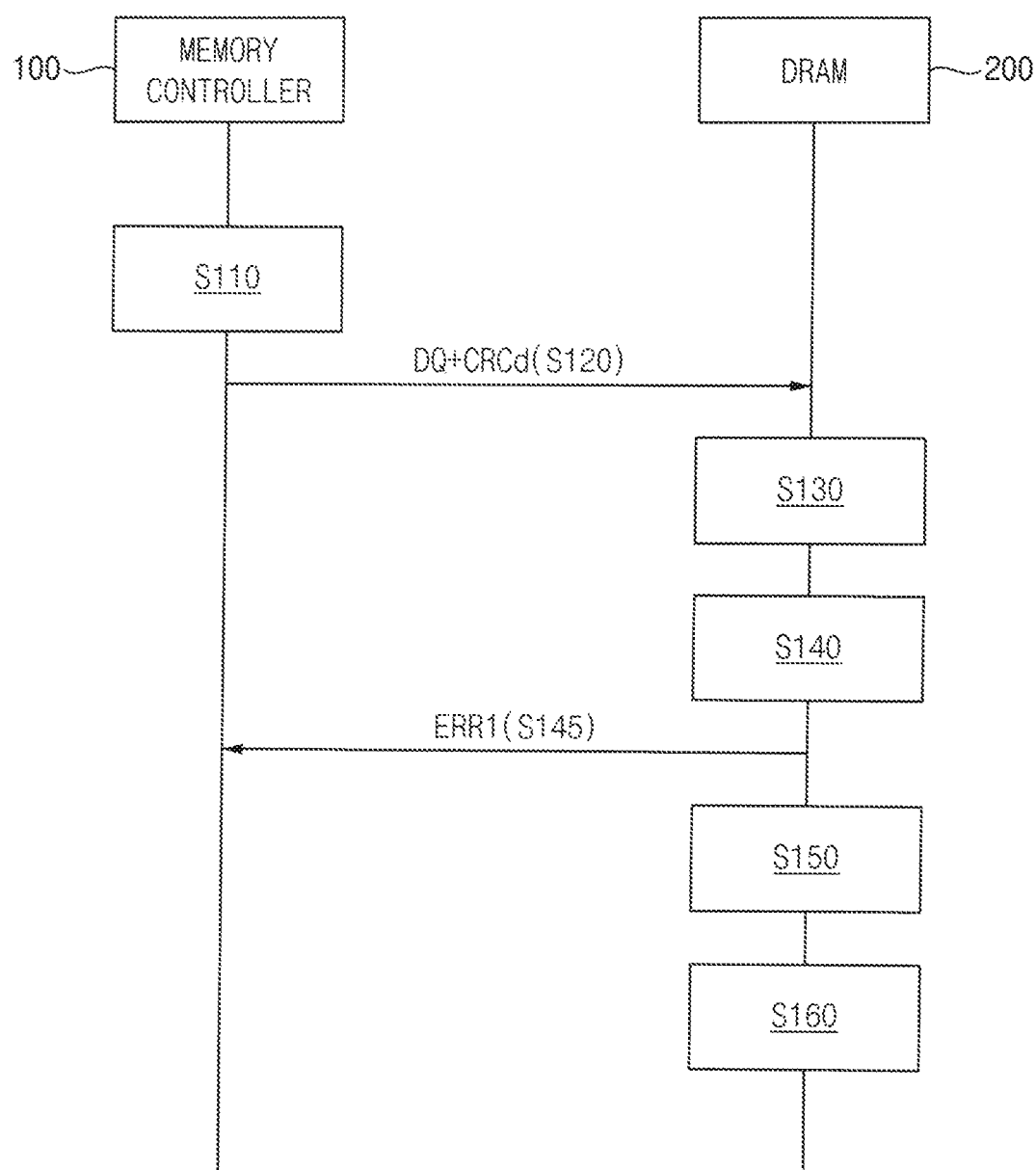
FIG. 17 is operation sequence associated with a method of FIG. 16.

FIG. 16 is a flow chart illustrating a method of operating a memory system according to example embodiments and FIG. 17 is operation sequence associated with a method of FIG. 16.

FIGS. 16 and 17 relate to a write operation performed in the memory system of FIG. 1.

Referring to FIGS. 1 through 12, 14, 16 and 17, for performing a write operation in the memory system 10 including the memory controller 100 and the semiconductor memory device 200, the CRC generator 135 in the memory controller 100 may generate the system parity data CRCd based on the main data DQ to be transmitted to the semiconductor memory device 200 (operation S110).

The memory controller 100 may transmit the main data DQ and the system parity data CRCd to the semiconductor memory device 200 through the link 50 (operation S120).

The CRC generator 325 in the semiconductor memory device 200 may generate the first reference system parity data CRCr1 based on the main data DQ received through the link 50 (operation S130) and may provide the first reference system parity data CRCr1 to the CRC checker 330.

The CRC checker 330 may compare the system parity data CRCd with the first reference system parity data CRCr1 to generate the first error flag ERR1 based on the comparison (operation S140), may transmit the first error flag ERR1 having a first logic level to the memory controller 100 in response to the system parity data CRCd being different from the first reference system parity data CRCr1 (operation S145 of FIG. 17), and may receive the main data DQ and the system parity data CRCd again from the memory controller 100.

In response to the system parity data CRCd matching the first reference system parity data CRCr1, the CRC generator 325 and the CRC checker 330 may provide the main data DQ and the system parity data CRCd to the ECC encoder 420.

The ECC encoder 420 may perform an ECC encoding operation on the main data DQ and the system parity data CRCd to generate the parity data PRT (operation S150).

The ECC encoder 420 may store the main data DQ, the system parity data CRCd and the parity data PRT in a target page of the memory cell array 310 through the I/O gating circuit 290 (operation S160). The ECC encoder 420 may store the main data DQ and the system parity data CRCd in the normal cell region NCA of the first bank array 310a and may store the parity data PRT in the redundancy cell region RCA of the first bank array 310a. The ECC encoder 420, the ECC decoder 440, the CRC generator 325 and/or the CRC checker 330 may be circuits that include hardware, software, or a combination thereof.

Figure 18:
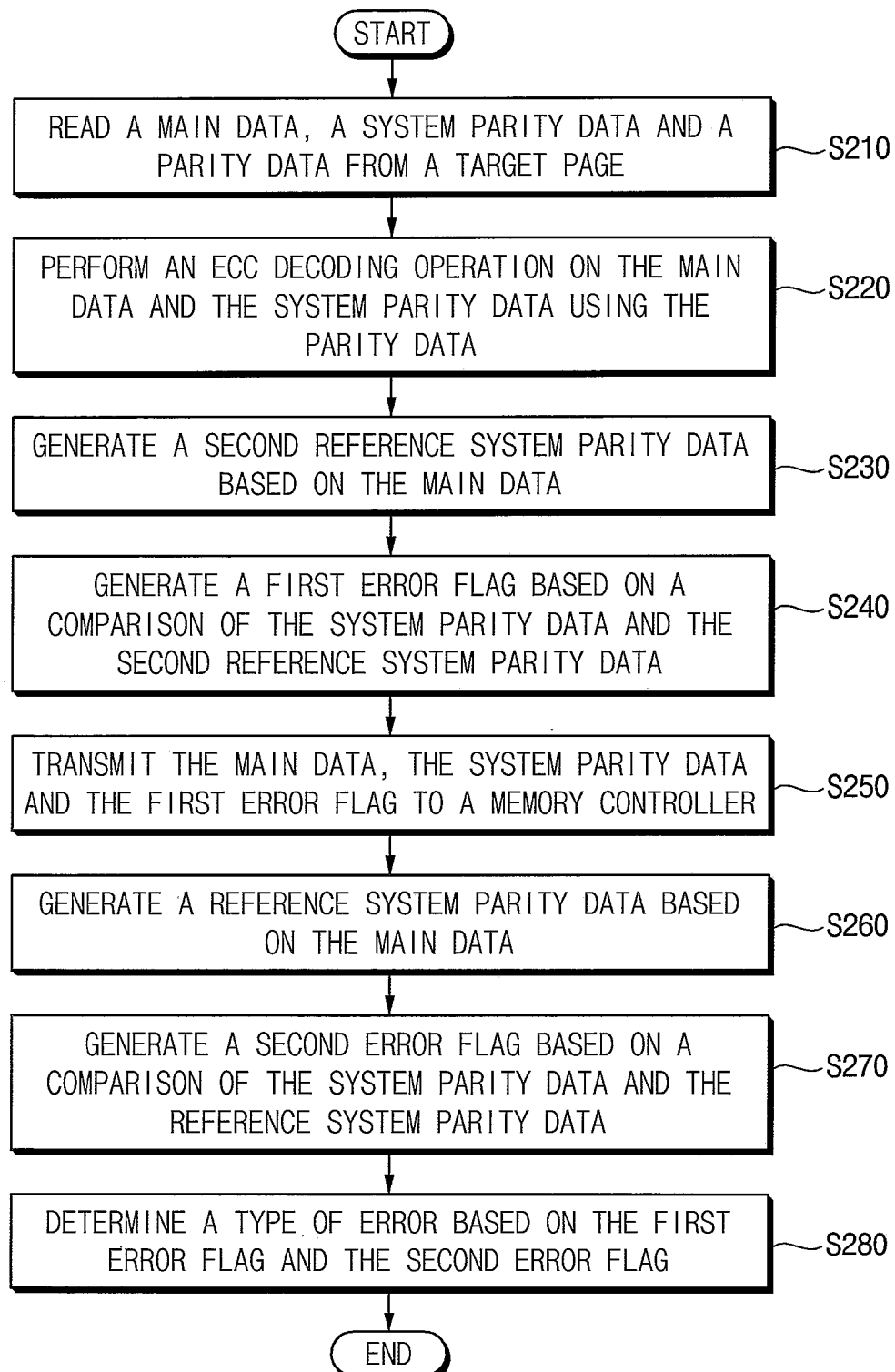
FIG. 18 is a flow chart illustrating a method of operating a memory system according to example embodiments.
Figure 19:
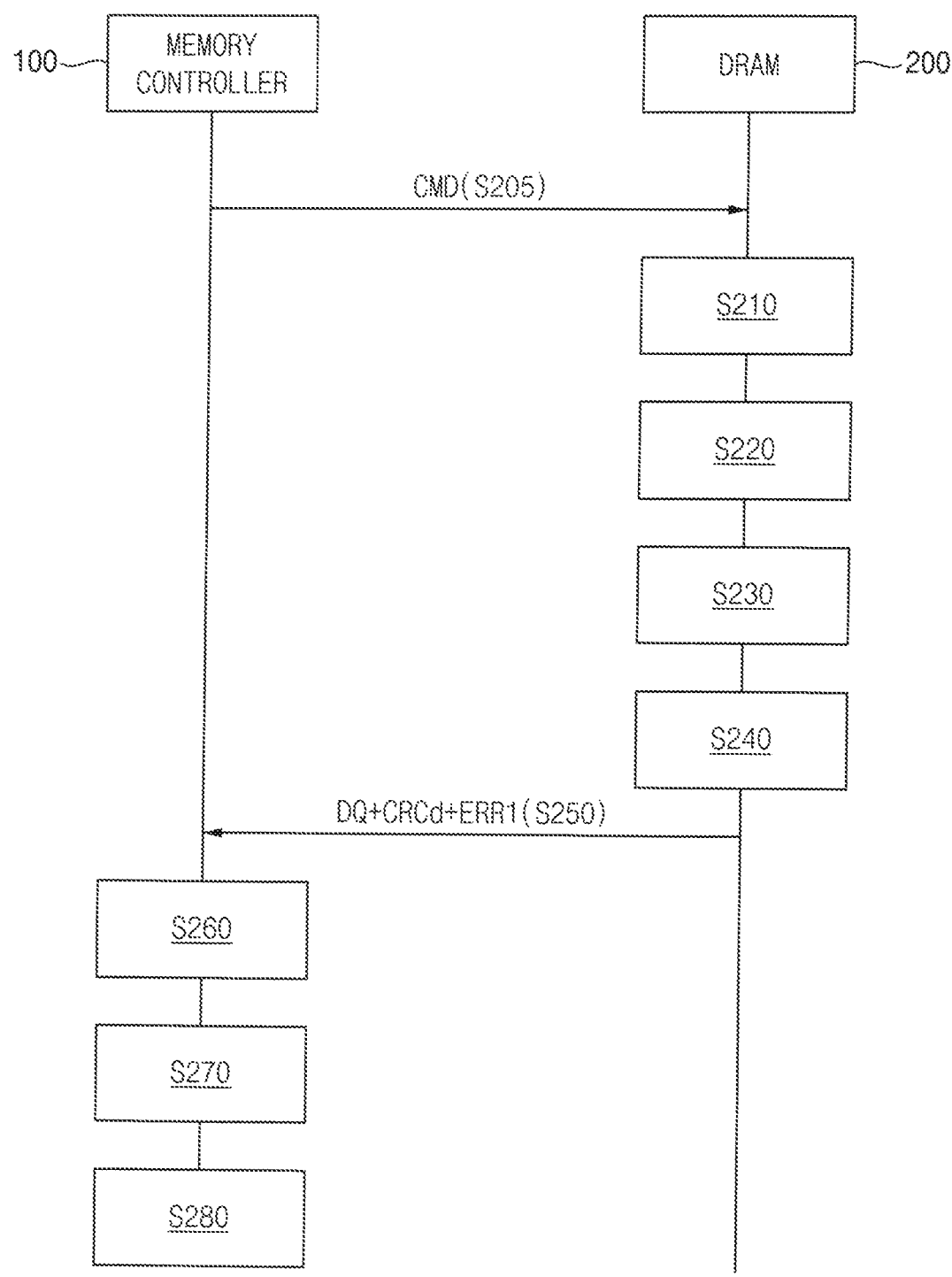
FIG. 19 is operation sequence associated with a method of FIG. 18.

FIG. 18 is a flow chart illustrating a method of operating a memory system according to example embodiments and FIG. 19 is operation sequence associated with a method of FIG. 18.

FIGS. 18 and 19 relate to a read operation performed in the memory system of FIG. 1.

Referring to FIGS. 1 through 11, 13, 15, 18 and 19, for performing a read operation in the memory system 10 including the memory controller 100 and the semiconductor memory device 200, the memory controller 100 may apply a read command CMD to the semiconductor memory device 200 (operation S205).

In response to the read command, the ECC decoder 440 may read the main data DQ, the system parity data CRCd, and parity data PRT from a target page of the memory cell array 310, through the I/O gating circuit 290 (operation S210).

The ECC decoder 440 may perform an ECC decoding operation on the main data DQ and the system parity data CRCd using the parity data PRT to correct a correctable error in the main data DQ and the system parity data CRCd2 (operation S220) and may provide the main data DQ and the system parity data CRCd to the CRC engine 320.

The CRC generator 325 may generate the second reference system parity data CRCr2 based on the main data DQ (operation S230) and may provide the second reference system parity data CRCr2 to the CRC checker 330.

The CRC checker 330 may compare the system parity data CRCd and the second reference system parity data CRCr2 to generate the first error flag ERR1 based on the comparison (operation S240) and may determine a logic level of the first error flag ERR1 based on the comparison. In response to the system parity data CRCd being different from the second reference system parity data CRCr2, the CRC checker 330 may generate the first error flag ERR1 with a first logic level.

The CRC engine 320 may transmit the main data DQ, the system parity data CRCd and the first error flag ERR1 to the memory controller 100 (operation S250).

The CRC generator 135 in the memory controller 100 may generate the reference system parity data CRCr based on the main data DQ received through the link 50 (operation S260) and may provide the reference system parity data CRCr to the CRC checker 140.

The CRC checker 140 may generate the second error flag ERR2 based on comparison of the system parity data CRCd with the reference system parity data CRCr (operation S270) and may determine a logic level of the second error flag ERR2 based on the comparison.

The system ECC engine 160 (or, the CPU 110) may receive the first error flag ERR1 and the second error flag ERR2 and may determine a type of error included in the main data DQ received through the link 50 based on the first error flag ERR1 and the second error flag ERR2 (operation S280).

Therefore, in the semiconductor memory device and the memory system including the semiconductor memory device, the semiconductor memory device stores the system parity data generated by the memory controller in the memory cell array and may determine that a non-single-bit error in the write data or the read data is generated in the link during data transmission or is generated in volatile memory cells in the memory cell array by using the system parity data.

Figure 20:
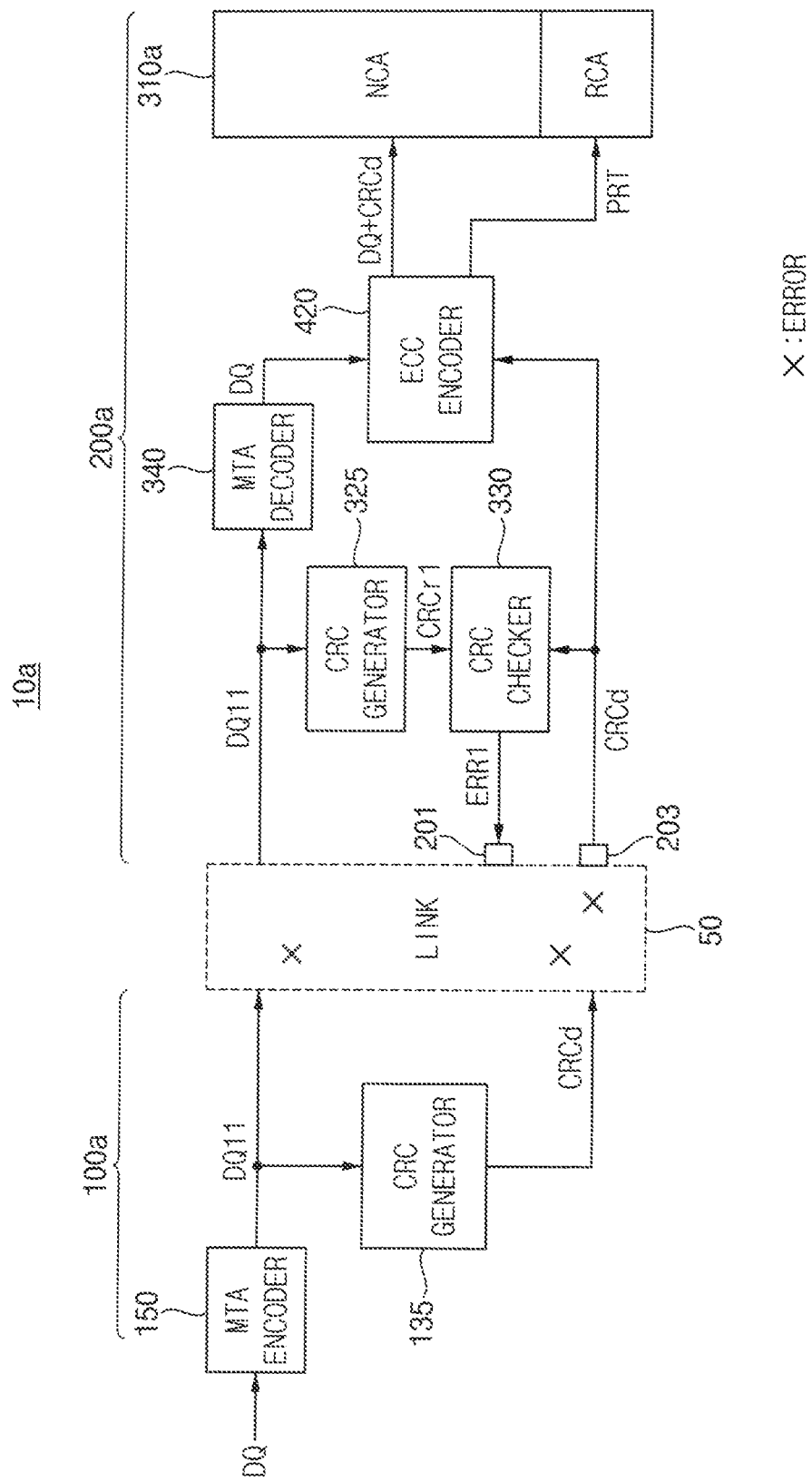
FIGS. 20 and 21 illustrate a memory system according to example embodiments.
Figure 21:
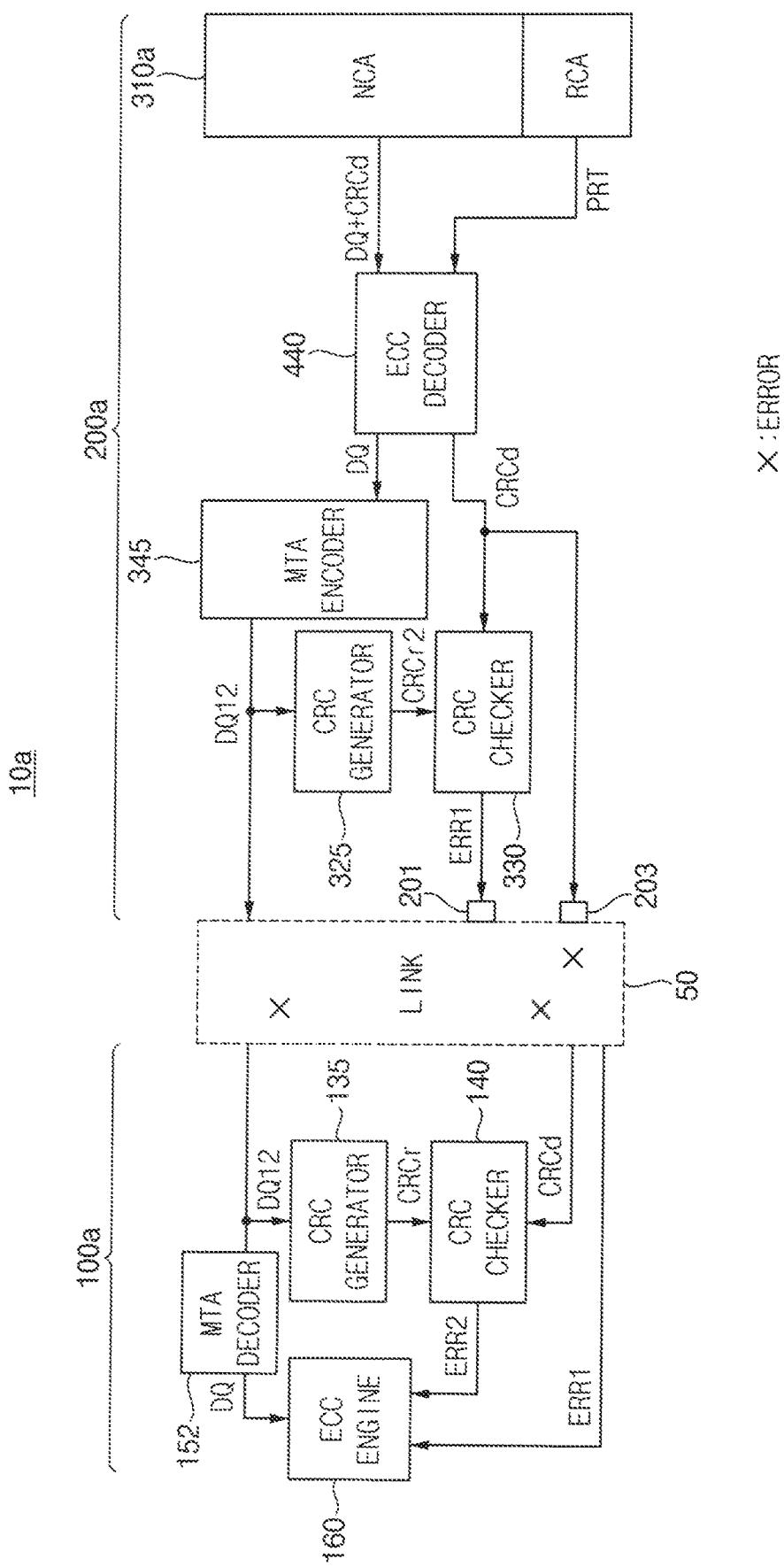

FIGS. 20 and 21 illustrate a memory system according to example embodiments.

Referring to FIGS. 20 and 21, a memory system 10*a* may include a memory controller 100*a* and a semiconductor memory device 200*a*, the memory controller 100*a* may further include a maximum transition avoidance (MTA) encoder 150 and a MTA decoder 152 when the memory controller 100*a* is compared with the memory controller 100 in FIGS. 14 and 15, and the semiconductor memory device 200*a* may further include a MTA encoder 345 and a MTA decoder 340 when the semiconductor memory device 200*a* is compared with the semiconductor memory device 200 in FIGS. 14 and 15.

An MTA encoding is an encoding scheme in which data burst are divided into two half bursts, one bit is extracted in each of the half bursts, the extracted bit is transmitted through a DBI line, and other bits of the half bursts are transmitted after being encoded for avoiding maximum transition.

FIG. 20 relates a write operation performed in the memory system 10*a* and FIG. 21 relates a read operation performed in the memory system 10*a*.

Referring to FIG. 20, in the write operation, the MTA encoder 150 may perform an MTA encoding on the main data DQ to be transmitted to the semiconductor memory device 200 to generate an encoded main data DQ11 and the CRC generator 135 may generate the system parity data CRCd based on the encoded main data DQ11.

The memory controller 100*a* may transmit the encoded main data DQ11 and the system parity data CRCd to the semiconductor memory device 200*a* through the link 50.

The CRC generator 325 in the semiconductor memory device 200*a* may generate the first reference system parity data CRCr1 based on the encoded main data DQ11 received through the link 50 and may provide the first reference system parity data CRCr1 to the CRC checker 330. The semiconductor memory device 200*a* may receive the system parity data CRCd through a first dedicated pin 203.

The CRC checker 330 may compare the system parity data CRCd with the first reference system parity data CRCr1 to generate the first error flag ERR1 based on the comparison, may transmit the first error flag ERR1 having a first logic level to the memory controller 100 in response to the system parity data CRCd being different from the first reference system parity data CRCr1, and may receive the encoded main data DQ11 and the system parity data CRCd again from the memory controller 100.

In response to the system parity data CRCd matching the first reference system parity data CRCr1, the CRC generator 325 and the CRC checker 330 may provide the encoded main data DQ11 and the system parity data CRCd to the MTA decoder 340 and the ECC encoder 420, respectively.

The MTA decoder 340 may perform an MTA decoding on the encoded main data DQ11 to recover the main data DQ and may provide the main data DQ to the ECC encoder 420.

Referring to FIG. 21, in the read operation, ECC decoder 440 may read the main data DQ and the system parity data CRCd from the normal cell region NCA of the first bank array 310*a* and may read the parity data PRT from the redundancy cell region RCA of the first bank array 310*a*, through the I/O gating circuit 290 in FIG. 13.

The ECC decoder 440 may perform an ECC decoding operation on the main data DQ and the system parity data CRCd using the parity data PRT to correct a correctable error in the main data DQ and the system parity data CRCd and may provide the main data DQ and the system parity data CRCd to the MTA encoder 345 and the CRC checker 330, respectively.

The MTA encoder 345 may perform an MTA encoding on the main data DQ to generate an encoded main data DQ12 and may provide the encoded main data DQ12 to the CRC generator 325.

The CRC generator 325 may generate the second reference system parity data CRCr2 based on the encoded main data DQ12 and may provide the second reference system parity data CRCr2 to the CRC checker 330.

The CRC checker 330 may compare the system parity data CRCd and the second reference system parity data CRCr2, may generate the first error flag ERR1 based on the comparison, and may determine a logic level of the first error flag ERR1 based on the comparison. In response to the system parity data CRCd being different from the second reference system parity data CRCr2, the CRC checker 330 may transmit the first error flag ERR1 having the first logic level to the memory controller 100a through a dedicated second pin 201 and the link 50, and may transmit the encoded main data DQ12 and the system parity data CRCd to the memory controller 100a through the dedicated first pin 203 the link 50.

The CRC generator 135 may generate the reference system parity data CRCr based on the encoded main data DQ12 received through the link 50, and may provide the reference system parity data CRCr to the CRC checker 140.

The CRC checker 140 may compare the system parity data CRCd received through the link 50 with the reference system parity data CRCr and determine a logic level of the second error flag ERR2 based on the comparison. In response to the system parity data CRCd being different from the reference system parity data CRCr, the CRC checker 140 may provide the second error flag ERR2 having the first logic level to the system ECC engine 160.

The MTA decoder 152 may perform an MTA decoding on the encoded main data DQ12 to recover the main data DQ and may provide the main data DQ to the system ECC engine 160.

Figure 22:
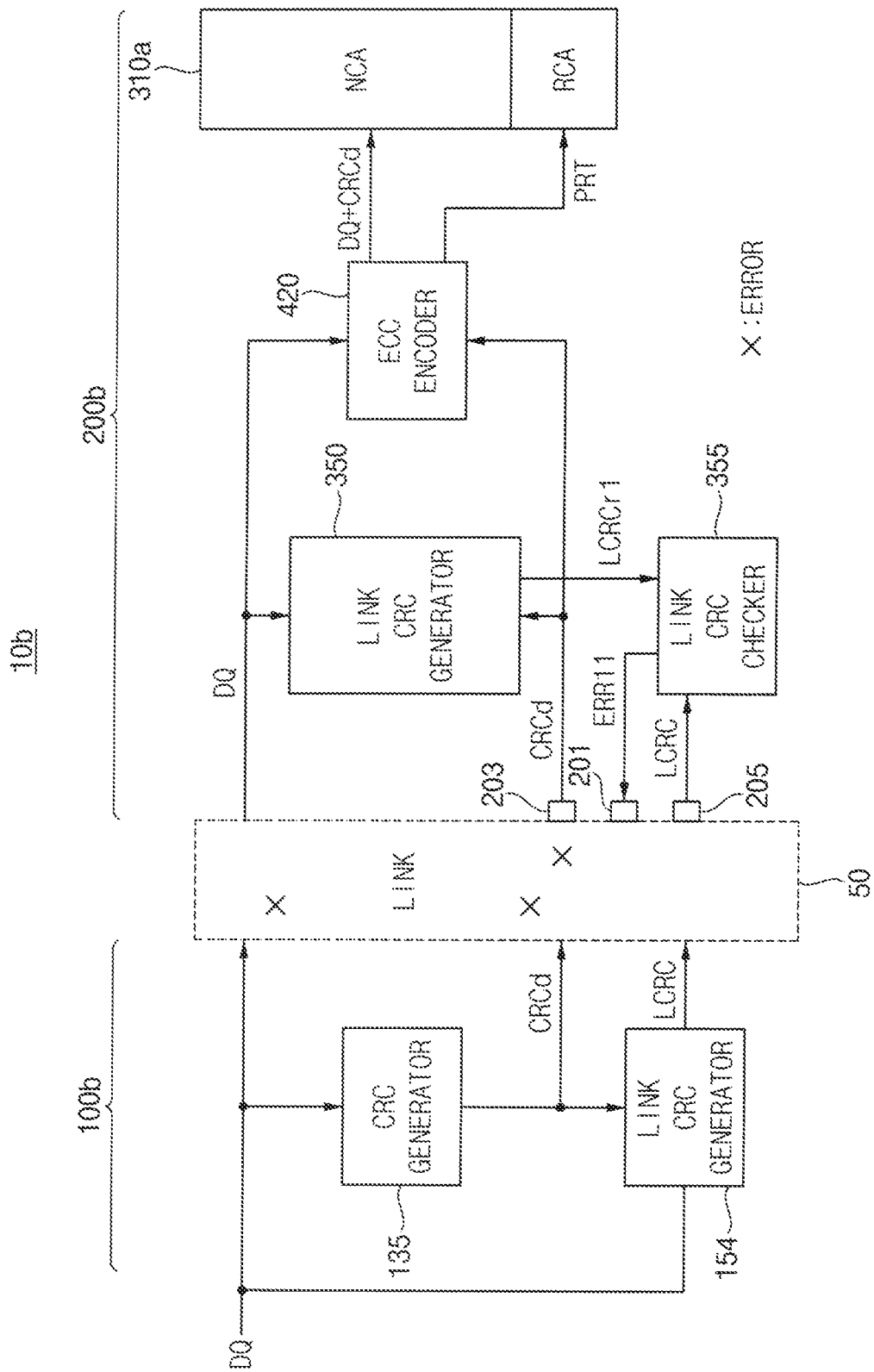
FIGS. 22 and 23 illustrate a memory system according to example embodiments.
Figure 23:
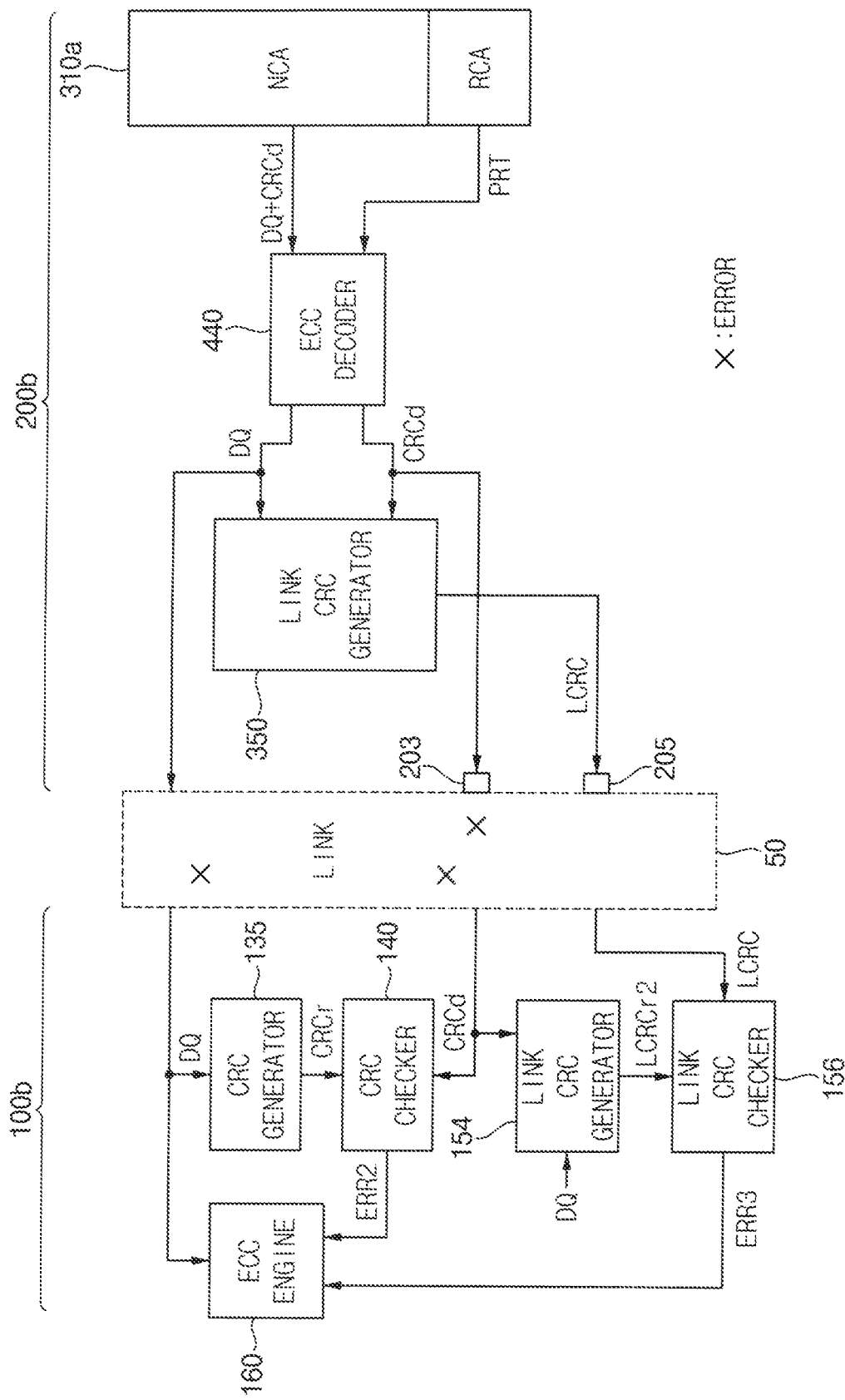

FIGS. 22 and 23 illustrate a memory system according to example embodiments.

Referring to FIGS. 22 and 23, a memory system 10b may include a memory controller 100b and a semiconductor memory device 200b, the memory controller 100b may further include a link CRC generator 154 and a link CRC checker 156 when the memory controller 100b is compared with the memory controller 100 in FIGS. 14 and 15, and the semiconductor memory device 200b may include a link CRC generator 350 and a link CRC checker 355 instead of the CRC generator 325 and the CRC checker 330 when the semiconductor memory device 200b is compared with the semiconductor memory device 200 in FIGS. 14 and 15.

FIG. 22 relates a write operation performed in the memory system 10b and FIG. 23 relates a read operation performed in the memory system 10b. In FIG. 22, description repeated with FIG. 14 will be omitted and in FIG. 23, description repeated with FIG. 15 will be omitted.

Referring to FIG. 22, in the write operation, the link CRC generator 154 may generate a link parity data LCRC for detecting error during data transmission based on the main data DQ and the system parity data CRCd to be transmitted to the semiconductor memory device 200b and may provide the link parity data LCRC to the semiconductor memory device 200b through the link 50.

The semiconductor memory device 200b may receive the main data DQ through data pins, may receive the system parity data CRCd through a first dedicated pin 203 and may receive the link parity data LCRC through a dedicated third pin 205.

The link CRC generator 350 in the semiconductor memory device 200b may generate a first reference link parity data LCRCr1 based on the main data DQ and the system parity data CRCd and may provide the first reference link parity data LCRCr1 to the link CRC checker 355.

The link CRC checker 355 may compare the link parity data LCRC received through the link 50 with the first reference link parity data LCRCr1 to generate a first error flag ERR11 based on the comparison, may transmit the first error flag ERR11 having a first logic level to the memory controller 100 in response to the link parity data LCRC being different from the first reference link parity data LCRCr1, and may receive the main data DQ and the link parity data LCRC again from the memory controller 100b.

In response to the link parity data LCRC matching the first reference link parity data LCRCr1, the CRC generator 350 may provide the main data DQ and the link parity data LCRC to the ECC encoder 420.

Referring to FIG. 23, in the read operation, ECC decoder 440 may read the main data DQ and the system parity data CRCd from the normal cell region NCA of the first bank array 310a and may read the parity data PRT from the redundancy cell region RCA of the first bank array 310a, through the I/O gating circuit 290 in FIG. 13.

The ECC decoder 440 may perform an ECC decoding operation on the main data DQ and the system parity data CRCd using the parity data PRT to correct a correctable error in the main data DQ and the system parity data CRCd and may provide the main data DQ and the system parity data CRCd to the link CRC generator 350.

The link CRC generator 350 may generate the link parity data LCRC based on the main data DQ and the system parity data CRCd and may transmit the link parity data LCRC to the memory controller 100b through the third dedicated pin 205 and the link 50.

The link CRC generator 154 in the memory controller 100b may generate a reference link parity data LCRCr2 based on the main data DQ and the system parity data CRCd received through the link 50 and may provide the reference link parity data LCRCr2 to the link CRC checker 156.

The link CRC checker 156 may compare the link parity data LCRC with the reference link parity data LCRCr2, may generate a third error flag ERR3 based on the comparison and may determine a logic level of the third error flag ERR3 based on the comparison. In response to link parity data LCRC being different from the reference link parity data LCRCr2, the link CRC checker 156 may provide the third error flag ERR2 having the first logic level to the system ECC engine 160.

The system ECC engine 160 may receive the second error flag ERR2 and the third error flag ERR3 and may determine a type of error included in the main data DQ received through the link 50 based on the second error flag ERR2 and the third error flag ERR3.

Figure 24:
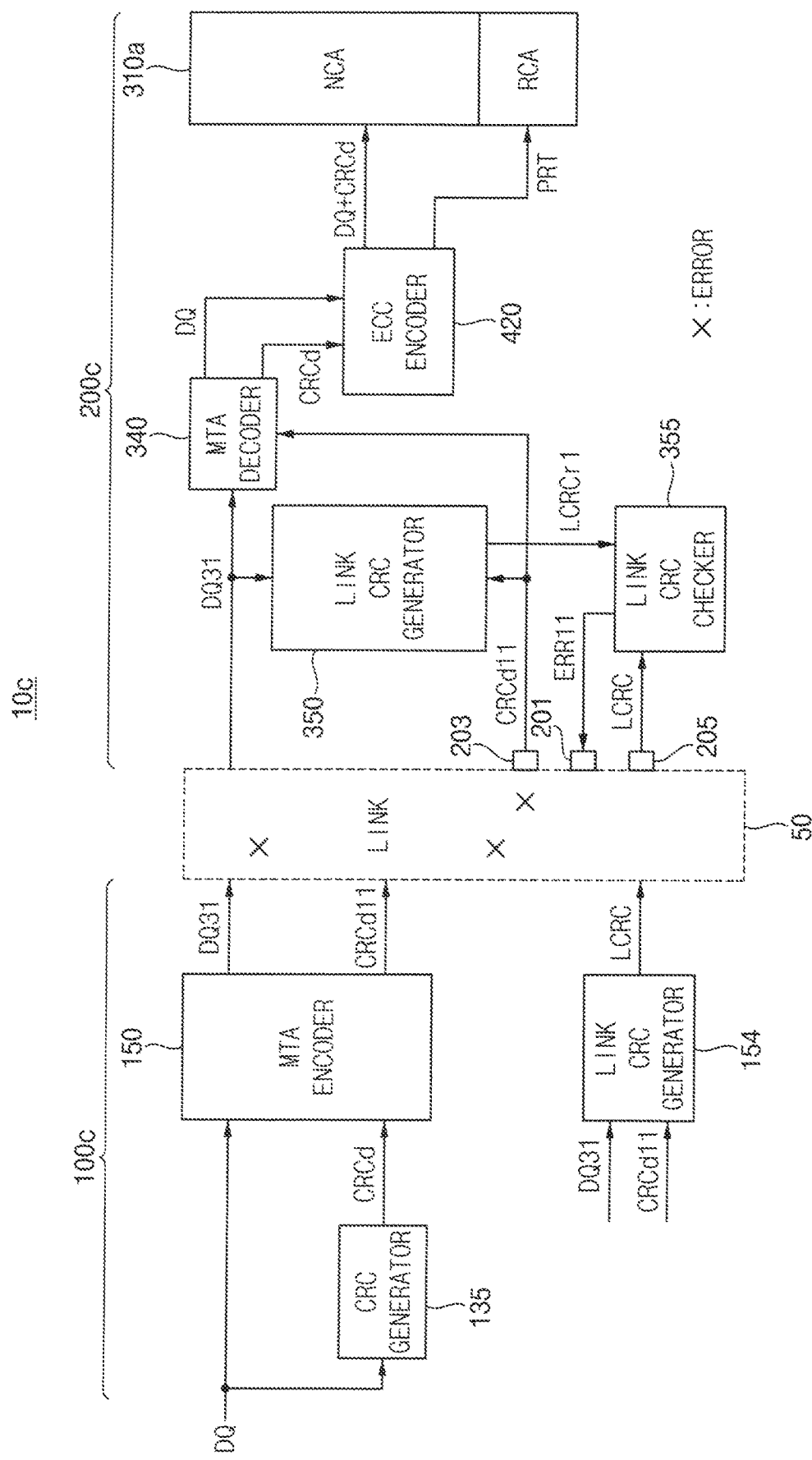
FIGS. 24 and 25 illustrate a memory system according to example embodiments.
Figure 25:
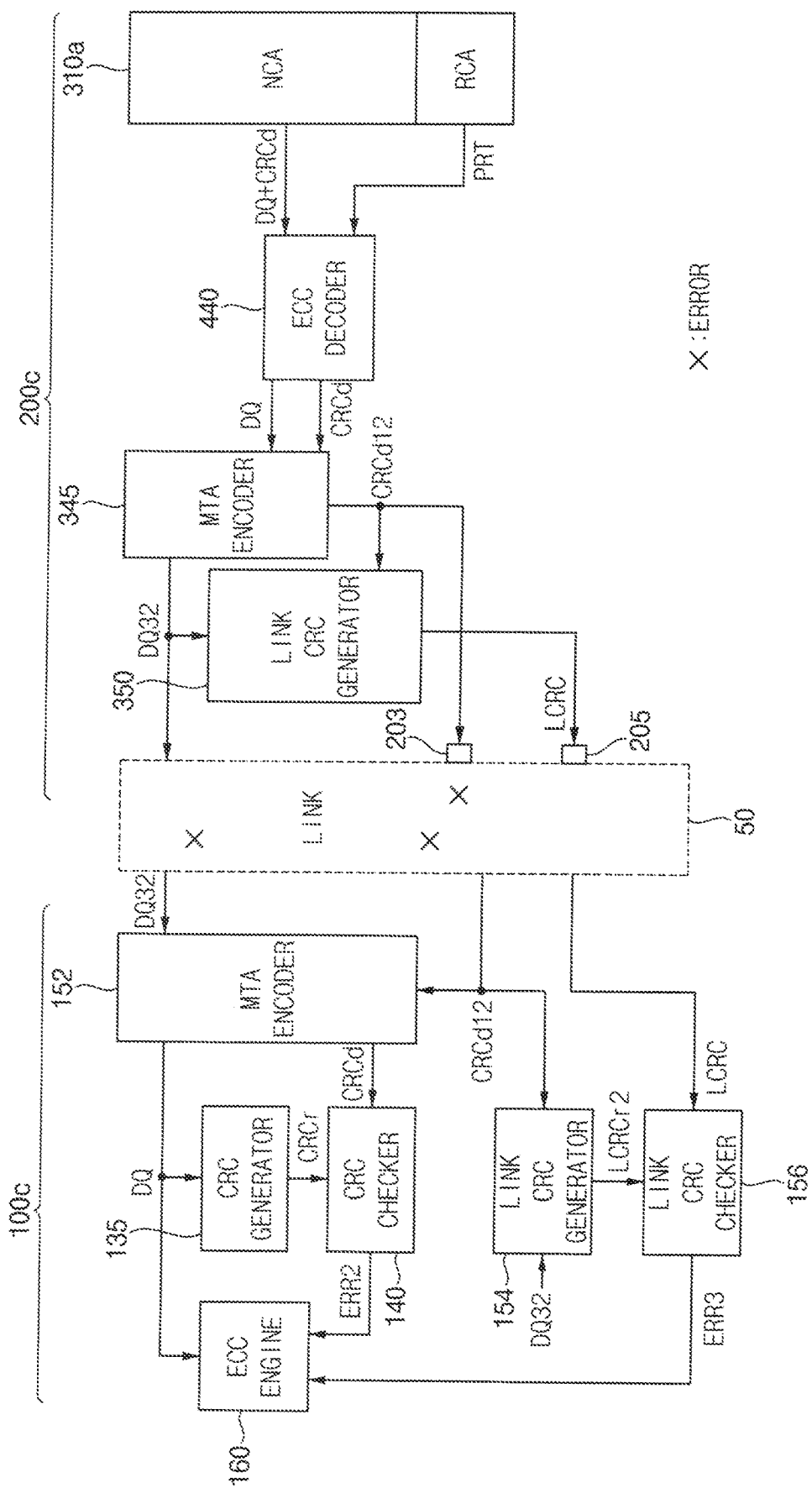

FIGS. 24 and 25 illustrate a memory system according to example embodiments.

Referring to FIGS. 24 and 25, a memory system 10c may include a memory controller 100c and a semiconductor memory device 200c, the memory controller 100c may further include an MTA encoder 150, an MTA decoder 152, a link CRC generator 154 and a link CRC checker 156 when the memory controller 100c is compared with the memory controller 100 in FIGS. 14 and 15, and the semiconductor memory device 200c may include an MTA decoder 340, an MTA encoder 345, a link CRC generator 350 and a link CRC checker 355 instead of the CRC generator 325 and the CRC checker 330 when the semiconductor memory device 200c is compared with the semiconductor memory device 200 in FIGS. 14 and 15.

FIG. 24 relates a write operation performed in the memory system 10c and FIG. 25 relates a read operation performed in the memory system 10c. In FIG. 24, description repeated with FIGS. 1, 20 and 22 will be omitted and in FIG. 25, description repeated with FIGS. 15, 21 and 23 will be omitted.

Referring to FIG. 24, in the write operation, the CRC generator 135 in the memory controller 100c may generate the system parity data CRCd based on the main data DQ to be transmitted to the semiconductor memory device 200c and may provide the system parity data CRCd to the MTA encoder 150.

The MTA encoder 150 may perform an MTA encoding on the main data DQ and the system parity data CRCd to be transmitted to the semiconductor memory device 200c to generate an encoded main data DQ31 and an encoded system parity data CRCd11 and may transmit the encoded main data DQ31 and the encoded system parity data CRCd11 to the semiconductor memory device 200c through the link 50.

The link CRC generator 154 may generate a link parity data LCRC for detecting error during data transmission based on the encoded main data DQ31 and the encoded system parity data CRCd11 to be transmitted to the semiconductor memory device 200c and may provide the link parity data LCRC to the semiconductor memory device 200c through the link 50.

The semiconductor memory device 200c may receive the main data DQ through data pins, may receive the encoded system parity data CRCd11 through the first dedicated pin 203, and may receive the link parity data LCRC through the dedicated third pin 205.

The link CRC generator 350 in the semiconductor memory device 200c may generate a first reference link parity data LCRCr1 based on the encoded main data DQ13 and the encoded system parity data CRCd11, and may provide the first reference link parity data LCRCr1 to the link CRC checker 355.

The link CRC checker 355 may compare the link parity data LCRC received through the link 50 with the first reference link parity data LCRCr1 to generate a first error flag ERR11 based on the comparison, may transmit the first error flag ERR11 having a first logic level to the memory controller 100 in response to the link parity data LCRC being different from the first reference link parity data LCRCr1, and may receive the encoded main data DQ31 and the encoded system parity data CRD11 again from the memory controller 100c.

The MTA decoder 340 may perform an MTA decoding on the encoded main data DQ31 and the encoded system parity data CRCd11 to recover the main data DQ and the system parity data CRCd and may provide the main data DQ and the system parity data CRCd to the ECC encoder 420.

Referring to FIG. 25, in the read operation, ECC decoder 440 may read the main data DQ and the system parity data CRCd from the normal cell region NCA of the first bank array 310a and may read the parity data PRT from the redundancy cell region RCA of the first bank array 310a, through the I/O gating circuit 290 in FIG. 13.

The ECC decoder 440 may perform an ECC decoding operation on the main data DQ and the system parity data CRCd using the parity data PRT to correct a correctable error in the main data DQ and the system parity data CRCd and may provide the main data DQ and the system parity data CRCd to the link CRC generator 350.

The MTA encoder 345 may perform an MTA encoding on the main data DQ and the system parity data CRCd to generate an encoded main data DQ32 and an encoded system parity data CRCd12 and may provide the encoded main data DQ32 and the encoded system parity data CRCd12 to the link CRC generator 350.

The link CRC generator 350 may generate the link parity data LCRC based on the encoded main data DQ32 and the encoded system parity data CRCd12 and may transmit the link parity data LCRC to the memory controller 100b through the third dedicated pin 205 and the link 50.

The MTA decoder 152 may perform an MTA decoding on the encoded main data DQ32 and the encoded system parity data CRCd12 received through the link 50 to recover the main data DQ and the system parity data CRCd, may provide the main data DQ to the CRC generator 135 and the system ECC engine 160, and may provide the system parity data CRCd to the CRC checker 140.

The CRC generator 135 may generate the reference system parity data CRCr based on the main data DQ and may provide the reference system parity data CRCr to the CRC checker 140.

The CRC checker 140 may compare the system parity data CRCd with the reference system parity data CRCr and may provide the system ECC engine 160 with the second error flag ERR2 having a first logic level in response to the system parity data CRCd being different from the reference system parity data CRCr.

The link CRC generator 154 may generate a reference link parity data LCRCr2 based on the encoded main data DQ32 and the encoded system parity data CRCd12 received through the link 50 and may provide the reference link parity data LCRCr2 to the link CRC checker 156.

The link CRC checker 156 may compare the link parity data LCRC with the reference link parity data LCRCr2, may generate a third error flag ERR3 based on the comparison and may determine a logic level of the third error flag ERR3 based on the comparison. In response to link parity data LCRC being different from the reference link parity data LCRCr2, the link CRC checker 156 may provide the third error flag ERR2 having the first logic level to the system ECC engine 160.

The system ECC engine 160 may receive the second error flag ERR2 and the third error flag ERR3 and may determine a type of error included in the main data DQ received through the link 50 based on the second error flag ERR2 and the third error flag ERR3.

Figure 26:
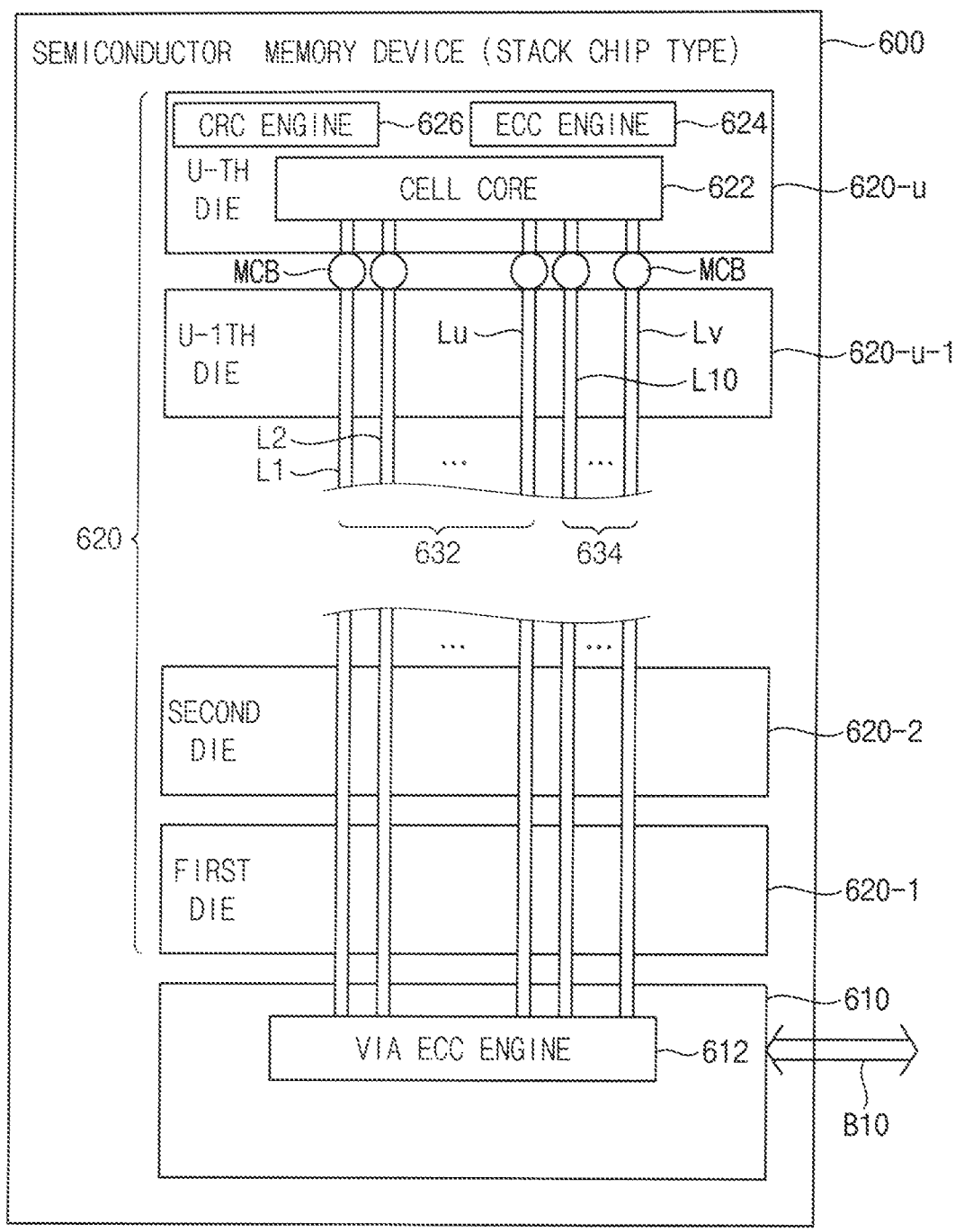
FIG. 26 is a block diagram illustrating a semiconductor memory device according to example embodiments.

FIG. 26 is a block diagram illustrating a semiconductor memory device according to example embodiments.

Referring to FIG. 26, a semiconductor memory device 600 may include at least one buffer die 610 and group dies 620 providing a soft error analyzing and correcting function in a stacked chip structure.

The group dies 620 may include a plurality of memory dies 620-1 to 620-u (u is a natural number greater than two) which are stacked on the at least one buffer die 610 and convey data through a plurality of through a plurality of silicon via (TSV) lines.

Each of the plurality of memory dies 620-1 to 620-u may include a cell core 622, an ECC engine 624 and a CRC engine 626. The cell core 622 may include a plurality of volatile memory cells coupled to a plurality of word-lines and a plurality of bit-lines.

The ECC engine 624 may employ the on-die ECC engine 400 of FIG. 9 and the CRC engine 626 may employ the CRC engine 320 in FIG. 7.

Therefore, the ECC engine 624 may perform an ECC encoding on a main data and a system parity data provided from the at least one buffer die 610 to generate a core parity data, may perform an ECC decoding on a main data and a system parity data provided from the cell core 622 using a system parity data provided from the cell core 622 to correct a correctable error in the main data and the system parity data and may provide the main data and the system parity data to the CRC engine 626.

The CRC engine 626, in a write operation, may receive a main data and a system parity data from an outside through the buffer die 610, may generate a first reference system parity data based on the main data, may compare the system parity data with the first reference system parity data, and may transmit a first error flag having a first logic level to the memory controller through the buffer die 610 in response to the system parity data being different from the first reference system parity data. The CRC engine 626 may store the main data and the system parity data in the cell core in response to the system parity data matching the first reference system parity data.

The CRC engine 626, in a read operation, may receive the main data and the system parity data from the ECC engine 624, may generate a second reference system parity data based on the main data, may compare the system parity data with the second reference system parity data and may transmit a first error flag having a first logic level to the memory controller through the buffer die 610 in response to the system parity data being different from the second reference system parity data.

The at least one buffer die 610 may include a via ECC engine 612 which corrects a transmission error using the transmission parity bits when a transmission error is detected from the transmission data received through the TSV lines and generate error-corrected data.

The semiconductor memory device 600 may be a stack chip type memory device or a stacked memory device which conveys data and control signals through the TSV lines. The TSV lines may also be called through electrodes.

A transmission error which occurs at the transmission data may be due to noise which occurs at the TSV lines. Since data fail due to the noise occurring at the TSV lines may be distinguishable from data fail due to a false operation of the memory die, it may be regarded as soft data fail (or a soft error). The soft data fail may be generated due to transmission fail on a transmission path, and may be detected and remedied by an ECC operation.

With the above description, a data TSV line group 632 which is formed at one memory die 620-u may include TSV lines L1, L2 to Lu, and a parity TSV line group 634 may include TSV lines L10 to Lv.

The TSV lines L1, L2 to Lu of the data TSV line group 632 and the parity TSV lines L10 to Lv of the parity TSV line group 634 may be connected to micro bumps MCB which are correspondingly formed among the memory dies 620-1 to 620-u.

Each of the plurality of memory dies 620-1 to 620-u may include DRAM cells each including at least one access transistor and one storage capacitor.

The semiconductor memory device 600 may have a three-dimensional (3D) chip structure or a 2.5D chip structure to communicate with a memory controller through a data bus B10. The at least one buffer die 610 may be connected with the memory controller through the data bus B10.

The via ECC engine 612 may determine whether a transmission error occurs at the transmission data received through the data TSV line group 632, based on the transmission parity bits received through the parity TSV line group 634.

When a transmission error is detected, the via ECC engine 612 may correct the transmission error on the transmission data using the transmission parity bits. When the transmission error is uncorrectable, the via ECC engine 612 may output information indicating occurrence of an uncorrectable data error.

Figure 27:
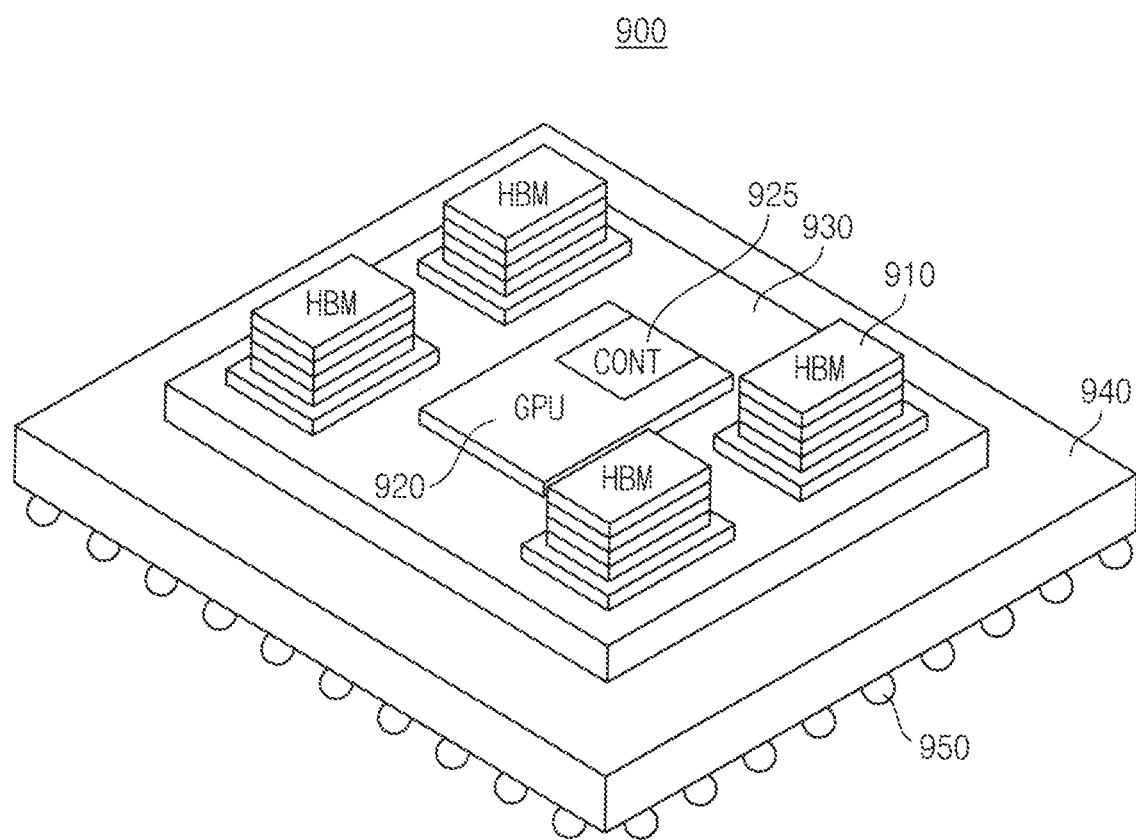
FIG. 27 is a diagram illustrating a semiconductor package including the stacked memory device according to example embodiments.

FIG. 27 is a diagram illustrating a semiconductor package including the stacked memory device according to example embodiments.

Referring to FIG. 27, a semiconductor package 900 may include one or more stacked memory devices 910 and a graphic processing unit (GPU) 920 and the GPU 920 includes a memory controller (CONT) 925.

The stacked memory devices 910 and the GPU 920 may be mounted on an interposer 930, and the interposer 930 on which the stacked memory devices 910 and the GPU 920 are mounted may be mounted on a package substrate 940. The package substrate 940 may be mounted on solder balls 950. The memory controller 925 may employ the memory controller 100 in FIG. 1.

Each of the stacked memory devices 910 may be implemented in various forms, and may be a memory device in a high bandwidth memory (HBM) form in which a plurality of layers are stacked. Accordingly, each of the stacked memory devices 910 may include a buffer die and a plurality of memory dies, and each of the plurality of memory dies may include a memory cell array, an on-die ECC engine and a CRC engine.

The plurality of stacked memory devices 910 may be mounted on the interposer 930, and the GPU 920 may communicate with the plurality of stacked memory devices 910. For example, each of the stacked memory devices 910 and the GPU 920 may include a physical region, and communication may be performed between the stacked memory devices 910 and the GPU 920 through the physical regions.

As mentioned above, in the semiconductor memory device and the memory system according to example embodiments, the semiconductor memory device stores the system parity data generated by the memory controller in the memory cell array and may determine that a non-single-bit error in the write data or the read data is generated in the link during data transmission or is generated in volatile memory cells in the memory cell array by using the system parity data.

The disclosure may be applied to semiconductor memory devices and memory systems employing the ECC.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the disclosure. Accordingly, all such modifications are intended to be included within the scope of the disclosure as defined in the claims.

What is claimed is:

1. A method of operating a semiconductor memory device that includes a memory cell array comprising a plurality of volatile memory cells coupled to respective ones of a plurality of word-lines and respective ones of a plurality of bit-lines and a cyclic redundancy check (CRC) engine, the method comprising:
    detecting, by the CRC engine, an error in a main data and a system parity data received from a memory controller through a link, the memory controller being external to the semiconductor memory device;
    generating, by the CRC engine, an error flag indicating whether the error that was detected corresponds to either a first type of error associated with the link or a second type of error associated with the volatile memory cells based on the system parity data; and
    transmitting, by the CRC engine, the error flag to the memory controller.

2. The method of claim 1, during a write operation based on a write command from the memory controller, further comprising:

generating, by the CRC engine, a first reference system parity data based on the main data from the memory controller; and determining, by the CRC engine, a logic level of the error flag associated with the first type of error based on comparison of the system parity data and the first reference system parity data.

3. The method of claim 2, wherein transmitting the error flag comprises:

transmitting the error flag having a first logic level to the memory controller in response to the system parity data being different from the first reference system parity data.

4. The method of claim 2, wherein generating the error flag comprises:

storing the system parity data in a first buffer in the CRC engine;

storing the first reference system parity data in a second buffer in the CRC engine;

generating a syndrome data by comparing the system parity data with the first reference system parity data;

generating the error flag based on the syndrome data; and determining the logic level of the error flag based on the syndrome data.

5. The method of claim 2, wherein the semiconductor memory device further includes an on-die error correction code (ECC) engine, and during the write operation, the method further comprising:

performing, by the on-die ECC engine, an ECC encoding operation on the main data and the system parity data to generate a parity data for correcting an error generated in the memory cell array; and storing the main data, the system parity data, and the parity data in a target page of the memory cell array.

6. The method of claim 5, further comprising:

storing, by the on-die ECC engine, the main data and the system parity data in a normal cell region of the target page; and storing, by the on-die ECC engine, the system parity data in a redundancy cell region of the target page.

7. The method of claim 5, during a read operation based on a read command from the memory controller, further comprising:

reading, by the on-die ECC engine, the main data, the system parity data, and the parity data from the target page;

performing, by the on-die ECC engine, an ECC decoding operation on the main data and the system parity data using the parity data to correct a correctable error in the main data and the system parity data; and transmitting, by the on-die ECC engine, the main data and the system parity data to the memory controller.

8. The method of claim 7, further comprising:

generating, by the CRC engine, a second reference system parity data based on the main data received from the on-die ECC engine; and determining, by the CRC engine, a logic level of the error flag associated with the second type of error based on comparison of the system parity data and the second reference system parity data.

9. The method of claim 8, wherein transmitting the error flag comprises:

transmitting the error flag having a first logic level to the memory controller in response to the system parity data being different from the second reference system parity data and indicating that the main data and the system parity data include uncorrectable errors associated with the volatile memory cells.

10. The method of claim 7, wherein performing the ECC decoding comprises:

generating a syndrome data based on the main data and the system parity data read from the target page;

generating an error position signal indicating a position of at least one error bit in the main data and the system parity data; and correcting the correctable error in the main data and the system parity data based on the error position signal.

11. The method of claim 2, further comprising:

generating the first reference system parity data by performing a CRC operation on the main data; and determining that a non-single-bit error in the main data is generated during data transmission on the link or is generated in the plurality of volatile memory cells in the memory cell array.

12. The method of claim 2, further comprising:

receiving the system parity data from the memory controller through a first dedicated pin; and transmitting the error flag to the memory controller through a second dedicated pin different from the first dedicated pin.

13. A method of operating a memory system that includes a semiconductor memory device and a memory controller configured to communicate with the semiconductor memory device and configured to control the semiconductor memory device, wherein the semiconductor memory device includes a memory cell array comprising a plurality of volatile memory cells coupled to respective ones of a plurality of word-lines and respective ones of a plurality of bit-lines, a first cyclic redundancy check (CRC) engine and an on-die error correction code (ECC) engine, the method comprising:

detecting, by the first CRC engine, an error in a main data and a system parity data received from the memory controller through a link;

generating, by the CRC engine, a first error flag indicating whether the error that was detected corresponds to either a first type of error associated with the link or a second type of error associated with the volatile memory cells based on the system parity data;

performing, by the on-die ECC engine, an ECC encoding operation on the main data and the system parity data; and performing, by the on-die ECC engine, an ECC decoding operation on the main data and the system parity data to correct a correctable error in the main data.

14. The method of 13, during a write operation on the semiconductor memory device, further comprising:

generating, by a second CRC engine in the memory controller, the system parity data based on the main data;

transmitting, by the second CRC engine, the main data and the system parity data to the semiconductor memory device;

generating, by the first CRC engine, a first reference system parity data based on the main data; and transmitting, by the first CRC engine, to the memory controller, the first error flag having a first logic level indicating that the first type of error occurs based on comparing the system parity data with the first reference system parity data.

15. The method of claim 14, further comprising:

transmitting, by the second CRC engine, the main data and the system parity data to the semiconductor memory device in response to receiving the first error flag having the first logic level.

16. The method of claim 14, wherein, performing the ECC encoding operation comprises:
generating a parity data based on the main data and the system parity data; and
storing the main data, the system parity data, and the parity data in a target page of the memory cell array,
wherein performing the ECC decoding operation comprises:
reading the main data, the system parity data, and the parity data from the target page;
performing the ECC decoding operation on the main data and the system parity data using the parity data to correct a correctable error in the main data and the system parity data; and
transmitting the main data and the system parity data to the memory controller.

17. The method of claim 16, further comprising:
generating, by the first CRC engine, a second reference system parity data based on the main data received from the on-die ECC engine; and
transmitting, by the first CRC engine, to the memory controller, the first error flag having a first logic level indicating that the second type of error occurs based on comparing the system parity data with the second reference system parity data.

18. The method of claim 14, further comprising:
generating, by the second CRC engine, a reference system parity data based on the main data received from the semiconductor memory device during a read operation;
generating, by the second CRC engine, a second error flag associated with the first type of error based on comparing the system parity data with the reference system parity data; and
determining, by the second CRC engine, a logic level of the second error flag based on the comparing.

19. The method of claim 18, further comprising:
determining, by a central processing unit in the memory controller, that an error in the main data is associated with either the first type of error or the second type of error based on the first error flag and the second error flag.

20. A method of operating a semiconductor memory device, wherein the semiconductor memory device includes a memory cell array comprising a plurality of volatile memory cells coupled to respective ones of a plurality of word-lines and respective ones of a plurality of bit-lines, a cyclic redundancy check (CRC) engine and an on-die error correction code (ECC) engine, the method comprising:
detecting, by the CRC engine, an error in a main data and a system parity data received from a memory controller through a link, the memory controller being external to the semiconductor memory device;
generating, by the CRC engine, an error flag indicating whether the error that was detected corresponds to either a first type of error associated with the link or a second type of error associated with the volatile memory cells based on the system parity data;
performing, by the on-die ECC engine, an ECC encoding operation on the main data and the system parity data;
performing, by the on-die ECC engine, an ECC decoding operation on the main data and the system parity data;
generating, by the CRC engine, a first reference system parity data based on the main data provided from the memory controller; and
determining, by the CRC engine, a logic level of the error flag associated with one of the first type of error or the second type of error based on comparison of the system parity data and the first reference system parity data.

* * * * *